(12) United States Patent
Masood et al.

(10) Patent No.: US 12,250,013 B2
(45) Date of Patent: Mar. 11, 2025

(54) SYSTEM AND METHOD FOR DIGITAL PREDISTORTION

(71) Applicant: NXP USA, Inc., Austin, TX (US)

(72) Inventors: Mir Adeel Masood, Mesa, AZ (US); Stephane Kerrurien, May sur Orne (FR); Peter Zahariev Rashev, Calgary (CA)

(73) Assignee: NXP USA, Inc., Austin, TX (US)

( * ) Notice: Subject to any disclaimer, the term of this patent is extended or adjusted under 35 U.S.C. 154(b) by 14 days.

(21) Appl. No.: 18/475,399

(22) Filed: Sep. 27, 2023

(65) Prior Publication Data

US 2024/0214014 A1   Jun. 27, 2024

(30) Foreign Application Priority Data

Dec. 21, 2022  (EP) .................................... 22306969

(51) Int. Cl.
  *H04B 1/04*  (2006.01)
(52) U.S. Cl.
  CPC ... *H04B 1/0475* (2013.01); *H04B 2001/0425* (2013.01); *H04B 2001/045* (2013.01)
(58) Field of Classification Search
  CPC .......... H04B 1/0475; H04B 2001/0425; H04B 2001/045
  USPC ................................................. 375/295–297
  See application file for complete search history.

(56) References Cited

U.S. PATENT DOCUMENTS

| | | | |
|---|---|---|---|
| 7,755,425 B2 | 7/2010 | Klingberg et al. | |
| 2013/0243117 A1* | 9/2013 | Jeckeln | H04L 27/0004 375/296 |
| 2014/0211882 A1* | 7/2014 | Zhao | H04L 27/368 375/296 |
| 2020/0382147 A1* | 12/2020 | Menkhoff | H03F 1/3247 |
| 2021/0384891 A1 | 12/2021 | Enzinger et al. | |
| 2022/0166389 A1* | 5/2022 | Hamid | H03F 3/245 |
| 2024/0022271 A1* | 1/2024 | Levitan | H03F 3/245 |

OTHER PUBLICATIONS

Walker, Aaron et al; "Multi-slice Behavioral Model of RF Systems and Devices"; Proceedings IEEE Radio and Wireless Conference; pp. 71-74; (2004).

(Continued)

*Primary Examiner* — Emmanuel Bayard

(57) ABSTRACT

Systems and methods for digital predistortion (DPD) are disclosed herein. In an example embodiment, a digital front-end circuit includes a digital predistortion (DPD) block having a first input terminal and first output terminal, a PA having a second input terminal and second output terminal, and a transmitter coupling the first output terminal at least indirectly with the second input terminal. The DPD block is configured to receive a first input signal and to provide a first output signal having first and second components at the first output terminal. The DPD block includes a main distortion kernel that is configured to generate the first component, and a nonlinear memory kernel that is configured to generate the second component. The nonlinear memory kernel is configured to perform processing at least in part by a nonlinear envelope modulator including a linear finite impulse response (FIR) filter.

20 Claims, 7 Drawing Sheets

(56) References Cited

OTHER PUBLICATIONS

Ding, Lei et al; "A Robust Digital Baseband Predistorter Constructed Using Memory Polynomials"; IEEE Transactions on Communications, vol. 52, No. 1; pp. 159-165 (Jan. 2004).
Zhu, Anding et al; "Behavioral Modeling of RF power Amplifiers Based on Pruned Volterra Series"; IEEE Microwave and Wireless Components Letters, vol. 14, No. 12; pp. 563-565; (Dec. 2004).
Jang, Wonhoon; "Modeling asymmetric distortion in multichannel radio frequency communication systems"; PhD dissertation, North Carolina State University; 148 pages; (2006).
Morgan, Dennis R. et al; "A Generalized Memory Polynomial Model for Digital Predistortion of RF Power Amplifiers"; IEEE Transactions on Signal Processing, vol. 54, No. 10; pp. 3852-3860; (Oct. 2006).
Zhu, Anding et al; "Dynamic Deviation Reduction-Based Volterra Behavioral Modeling of RF Power Amplifiers"; IEEE Transactions on Microwave Theory and Techniques, vol. 54, No. 12; pp. 4323-4332 (Dec. 2006).
Jang, W. et al; "Behavioural modelling of amplifier asymmetry in the time domain"; Int'l J. of Numerical Modelling: Electronic Networks, Devices and Fields; Wiley Online Library; Jun. 18, 2012; 15 pages.
Rahmanian, Shahabuddin et al; "Efficient FPGA Implementation of a Digital Predistorter for Power Amplifier Linearization"; Circuits, Systems, and Signal Processing, vol. 39; 20 pages (2020).

\* cited by examiner

SYSTEM AND METHOD FOR DIGITAL PREDISTORTION

CROSS-REFERENCE TO RELATED APPLICATION

This application claims priority under 35 U.S.C. § 119 to European patent application no. 22306969.1, filed 21 Dec. 2022, the contents of which are incorporated by reference herein.

FIELD OF THE DISCLOSURE

This disclosure relates generally to communications circuits and, more particularly, to systems for digital predistortion (DPD) for a power amplifier (PA), such as digital front-end circuits for transmitters, as well as methods for DPD.

BACKGROUND OF THE DISCLOSURE

Growing demand of high data rates and exponential growth of wireless subscribers has led to the widespread use of spectrum efficient complex modulation schemes with high peak to average ratio (PAPR) and wideband signal bandwidth. These complex modulation schemes pose significant challenges for the linearization techniques for radio frequency (RF) power amplifiers.

Digital predistortion (DPD) is a widely used PA linearization technique that allows for improving the efficiency of the PA by reducing the backoff while meeting the required linearity conditions such as spectrum emission mask (SEM) and adjacent channel power (ACP) specifications. Yet modern complex modulation schemes with high signal PAPR and large bandwidths pose significant challenges for the performance of a DPD system. The performance of a DPD system may be enhanced by using higher sampling rates; however, minimizing the complexity cost may be a challenge. Indeed, a need exists for a DPD scheme that provides increased performance with minimal increase in complexity.

For at least one or more of these reasons, or one or more other reasons, it would be advantageous if new or improved systems could be developed, and/or improved methods of operation or implementation could be developed, so as to address any one or more of the concerns discussed above or to address one or more other concerns or provide one or more benefits.

DETAILED DESCRIPTION

The present disclosure in at least some embodiments relates to methods and systems that employ advanced behavioral modeling solutions with respect to the state-of-the-art generalized memory polynomial architecture for power amplifier (PA) and digital predistortion (DPD) models. In at least some such embodiments, such advanced behavioral modelling solutions have the same rich configurability and tunability options as conventional solutions, but in addition provide better description of memory effects over very wide bandwidth (BW). Also, in at least some embodiments, the implementation complexity for the advance behavioral modelling solutions is at least two times (2×) smaller for the same depth of memory dynamics as conventional solutions. Additionally, at least some such embodiments of the advanced behavioral modelling solutions are applicable to high power, mid power, and/or low power broadband radio frequency (RF) front end designs, supporting small to very large signal bandwidths in the areas of mmWave beamformer integrated circuits (ICs), wireless local area network (WLAN) access points (APs), 5G and 6G massive multiple-input, multiple-output (M-MIMO) power amplifier modules (PAMs) and open radio access network (RAN) PAs. Further, at least some embodiments encompassed herein relate to methods and systems that employ low complexity models that are suitable for weakly nonlinear (NL) PAS.

Figure 1:
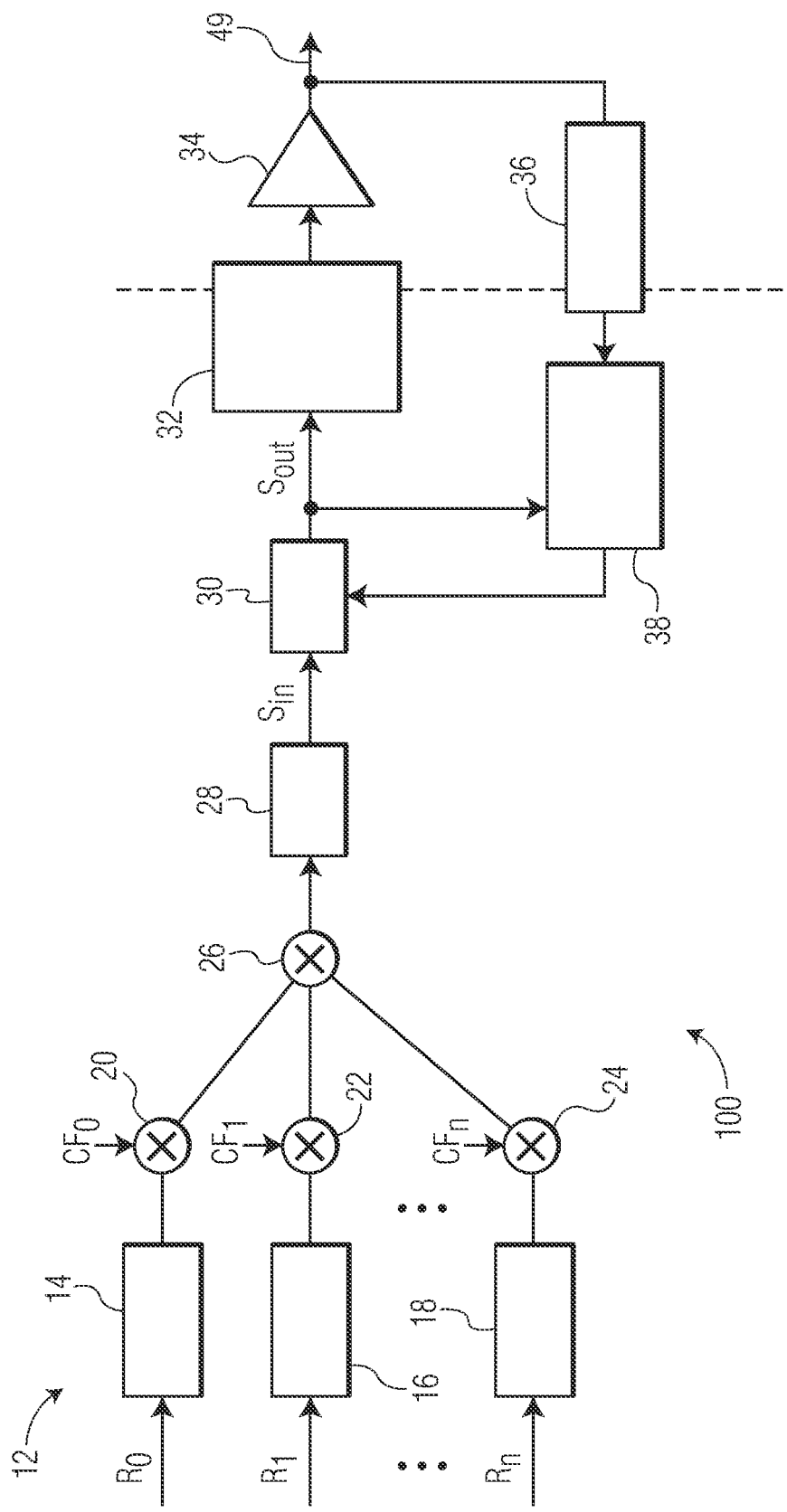
FIG. 1 illustrates, in block diagram form, a digital front-end for a transmitter incorporating digital predistortion (DPD) in accordance with an example embodiment.

Referring to FIG. 1, a block diagram is provided to schematically illustrate a digital front-end 100 for a transmitter incorporating DPD in accordance with an embodiment. In one embodiment, the digital front-end 100 is implemented on a single integrated circuit. The digital front-end 100 includes a digital up conversion (DUC) block 12, a crest factor reduction (CFR) block 28, a digital predistortion (DPD) block 30, a transmitter (TX) 32, a power amplifier (PA) 34, an observation receiver (RX) 36, and an adaptation unit 38 (where an analog-to-digital converter is also included within the RX 36). The digital up conversion block 12 includes a plurality of DUC elements represented by DUC elements 14, 16, and 18, mixers 20, 22, and 24, and a combining element 26. A vertical dashed line marks the demarcation between digital circuitry on the left side and analog circuitry on the right side of the dashed line. Note that the dashed line goes through the transmitter 32 indicating that part of the transmitter 32 is digital and part is analog. Also, the dashed line may pass through the observation receiver 36 indicating that part of the observation receiver is digital and part is analog.

In the digital front-end 100, a plurality of baseband signals labeled $R_0$-$R_n$ are provided to inputs of each of the DUC elements 14, 16, and 18. Each of the input baseband signals may have a different sample rate. The DUC elements up sample the baseband signals and provide output signals having a uniform output sample rate equal to R samples per second (sps). The mixers 20, 22, and 24 mix the DUC output signals with $CF_0$-$CF_n$, which are complex sinusoids corresponding to the center frequency of each respective carrier. The outputs of the mixers 20, 22, and 24 are provided to the combining element 26. In the illustrated embodiment, the combining element 26 is an adder and provides a composite signal to an input of the CFR block 28. The crest factor reduction block 28 provides a signal labeled $S_{in}(n)$ having a base sample rate R sps to DPD block (or module) 30. The signal labeled $S_{in}(n)$ is the input signal to the DPD block 30, and may also be referred to herein as a signal u(n). The DPD block 30 will be described in more detail below.

A predistorted transmit signal $S_{out}(n)$ is output by the DPD block 30 and is provided to the transmitter 32, and may also be referred to herein as a signal y(n). The output signal $S_{out}(n)$ is predistorted as described herein to compensate for the non-linearities of the power amplifier and memory effects. The transmitter 32 has an output connected to an input of the PA 34. The PA 34 is a conventional power amplifier. An output of the PA 34 is connected to an antenna (not shown) by way of an output node 49. The observation receiver 36 has an input connected to the output of the PA 34, and an output. The adaptation unit 38 has an input connected to the output of the RX 36, and an output for providing a DPD TUNING signal to a control input of the DPD block 30. The DPD TUNING signal comprises, for example, DPD parameters. The adaptation unit 38 monitors the output of the PA 34 and controls the predistortion model of the DPD block 30 in response to changes in the output of the PA 34. For example, non-linearities in the output signal of the PA 34 may change due to, for example, changing operating conditions such as changing temperature.

In at least some embodiments encompassed herein, the DPD block 30 utilizes an improved DPD technique involving a modified form of the Volterra series approximation. It will be recognized that the Volterra series is a powerful nonlinear approximation tool, which has been applied successfully to baseband behavioral modeling of high-power PAs. One of its most generic forms applicable to PAs is listed below in Equation (1), which shows the general Volterra series for approximation of baseband PA output y(n) as a sum of products of the baseband input u(n) (also known as the behavioral Volterra PA model):

$$y(n) = \sum_{p=0}^{P} \sum_{i_0=0}^{T_0} \cdots \sum_{i_p=0}^{T_p} h_p(i_0, i_1 \ldots i_p) \quad (1)$$

$$\prod_{j=0}^{\frac{p}{2}} u(n-i_j) \prod_{j=\frac{p}{2}+1}^{p} u(n-i_j)^*$$

for P ∈ {0, 2, 4 . . . even integers}, and where $h_p$ ($i_0$, $i_1$ . . . $i_p$) is the $p^{th}$ order Volterra kernel providing coefficients to weigh the products composed of differently offset baseband input signal samples u(n−$i_j$) and conjugated input signal samples u(n−$i_j$)* before they are summed up to construct the output signal y(n). With respect to utilization of this general Volterra series, the key requirement is that the number of conjugated baseband multiplicands is one less than the non-conjugated ones.

The performance of the formula shown by Equation (1) is excellent especially with split carrier signals, but its implementation complexity is large and, hence, it is not widely used in DPD models for PA linearization. A simplification is possible by replacing the balanced out conjugated and non-conjugated samples with envelope values as in Equation (2), which represents the simplification of the product format using an envelope instead of conjugated baseband signals:

$$\prod_{j=0}^{\frac{p}{2}} u(n-i_j) \prod_{j=\frac{p}{2}+1}^{p} u(n-i_j)^* \rightarrow u(n-i_1) \prod_{j=2}^{p} |u(n-i_j)| \quad (2)$$

where |u(n−$i_j$)| represents the absolute value of the baseband {I,Q} signal sample also known as envelope (the phase information is excluded). The performance of this approximation formula is at par with the general format of Equation (1) in terms of producing output samples in time domain. The original generalized formula has the advantage of modeling specific IMD products (IMDs) around the main carriers while the new format provides a powerful lumped approximation of the effect of all IMDs superimposed at the output. The benefit of reformatting of the double product terms in Equation (1) is significant, because the multiplication in the product series is real-valued and four times simpler than the original. The new equation also allows for even further simplification, which is especially desirable for building efficient real-time models.

With additionally imposed boundary conditions the product series turn into a polynomial which may be efficiently handled in purpose-built digital hardware (HW). More particularly, with further simplification of the envelope products as polynomials (i.e., include only terms which will constitute a power of p function), Equation (2) may be simplified to take the form of Equation (3):

$$\prod_{j=2}^{p} |u(n-i_j)| \rightarrow |u(n-i_{p-1})|^{p-1}, i_2 = i_3 = \ldots = i_{p-1} \quad (3)$$

where |u(n−$i_{p-1}$)|$^{p-1}$ is a polynomial term of power p−1 of the input signal envelope delayed by $i_{p-1}$ samples. This is an extreme simplification of the more generic product of the envelopes in the previous equation. It is achieved by locking all the time offsets i to one value and the same value. In a more moderate approach, it is possible to split the product into two (2) or three (3) parts with different time offsets, in which case there will be two (2) or three (3) polynomials.

It should additionally be appreciated that the full form of the standard Volterra series for PA and DPD modeling for the purposes of real-time linearization of the baseband output is listed in Equation (4):

$$y(n) = \sum_{p=1}^{P} \sum_{i_1=0}^{T_1} \sum_{i_2=0}^{T_2} h_p(i_1, i_2) u(n-i_1) |u(n-i_2)|^{p-1} \quad (4)$$

where |u(n−$i_{p-1}$)|$^{p-1}$ is a polynomial term of power p−1 of the input signal envelope delayed by $i_{p-1}$ samples. Equation (4) may be implemented in real-time HW with different targets for optimization like speed, power, cost, capacity. Many existing innovations are focused on efficient implementations of the triple sum. As a prerequisite, boundary conditions are set to simplify p, i1 and i2 by limiting the P, T1 and T2 and by skipping adjacent offsets. The process is called pruning and it is very much experimental and specific to the target PA circuit.

Notwithstanding the above discussion, the present disclosure envisions processing for DPD that utilizes modified forms of the Volterra series to achieve enhanced functionality, and that build upon details concerning the standard Volterra series that relate to Generalized Memory Polynomials (GMPs). More particularly, at least some embodiments encompassed herein utilize processing techniques that employ a differently-defined GMP format than that of Equation (4), and that allow for more efficient fulfillment of the same functionality as conventional processing techniques, resulting in power and area/speed benefits. In this regard, it should be recognized that the canonical form of the Standard Volterra series for PA and DPD modeling (as shown in Equation (4)) after grouping the time lags of the input samples and envelope may be represented as follows in Equation (5):

$$y(n) = SP + MP + CP \quad (5)$$

In Equation (5), y(n) is defined as the sum of static polynomial kernels (SP), main memory polynomial kernels (MP), and cross-term memory polynomials (CP), where the cross-term memory polynomials include each of type CT-B kernels and type CT-C kernels (the maximum depth of the lags 1, LB and LC, may be very different for each). SP, MP, and CP respectively are defined below in Equations (6), (7), and (8), respectively:

$$SP = u(n)\sum_{p=0}^{P_S} S_p |u(n)|^p \qquad (6)$$

$$MP = \sum_{m=1}^{M} u(n-m)\sum_{p=0}^{P_M} M_{q,p}|u(n-m)|^p \qquad (7)$$

$$CP = \sum_{l=0}^{LB}\left(\sum_{q=1}^{Q} u(n-l) \sum_{p=1}^{P_{CT_B}} CT_{q,p}|u(n-l-q)|^p\right) + \qquad (8)$$

$$\sum_{l=0}^{LC}\left(\sum_{r=1}^{R} u(n-l-r) \sum_{p=1}^{P_{CT_C}} CT_{r,p}|u(n-l)|^p\right)$$

Equation (5), with the three sets of terms as further defined in Equations (6), (7), and (8), constitutes the mathematical definition of the Volterra GMP approximation used widely in state-of-the-art DPD systems. The breakdown into several types of polynomial kernels allows for systematic approach to pruning for individual use-cases and applications. The goal is to find the minimal polynomial order and time lags which provide for an approximation of the PA output or its inverse to meet a certain level of performance. Pruning an entire type of kernels may bring the most significant benefits. Indeed, the grouping and the breakdown of the sums (in to the component terms SP, MP, and CP) is helpful because it allows for efficient computation as described next.

The polynomial sums of the Volterra GMP model may be viewed more generally as NL functions of the signal envelope, as represented by Equation (9):

$$\sum_{p=0}^{P_S} S_p |u(n)|^p; \sum_{p=0}^{P_M} M_{q,p}|u(n-m)|^p; \qquad (9)$$

$$\sum_{p=0}^{P_{CT_B}} CT_{q,p}|u(n-l-q)|^p; \sum_{p=0}^{P_{CT_C}} CT_{r,p}|u(n-l)|^p \to NL\{|u(n)|\}$$

There are many ways to specify and compute such functions. The preference of which option to use depends on the HW capabilities and system implementation goals. A first example of an efficient implementation option involves computing a NL function of the envelope in accordance with Equation (10), by using the efficient Horner's algorithm (vector processors):

$$\text{Option 1: } NL\{|u(n)|\} = \sum_{p=0}^{P} C_p |u(n)|^p \qquad (10)$$

Horner's algorithm may be implemented, for example, by digital signal processing (DSP). Additionally, a second example of an efficient implementation option involves computing a NL function of the envelope in accordance with Equation (11), by approximating it with a look-up table (LUT) with interpolated output, such as may be achieved using application specific integrated circuits (ASICs) or field programmable gate arrays (FPGAs):

$$\text{Option 2: } NL\{|u(n)|\} = LUT\{|u(n)|\} \qquad (11)$$

Each of these two implementation options has different characteristics. The direct polynomial computation by Horner's algorithm as indicated by Equation (10) is straightforward from an adaptation or identification point of view, but it is more computationally complex as it requires more multiply-add operations. The LUT approach represented by Equation (11) ensures fast and power efficient computation but is more challenging on the adaptation side, in two respects: (a) if the LUT contents are to be derived directly, the adaptation process becomes difficult; or (b) if using an intermediate step with polynomials, their conversion to tabulated LUTs would add extra time and/or complexity to the adaptation or identification process and there may be a relative degradation of performance to be dealt with. In addition to the two aforementioned implementation options involving Horner's algorithm and use of a LUT, respectively, there are other approaches which apply spline-type of NL approximation, which are in-between the aforementioned two options in terms of balancing out the above-discussed issues concerning use of those aforementioned two options.

Notwithstanding the merits of the aforementioned options/techniques for implementing Volterra GMP models for DPD in relation to PAs, the need to identify and implement NL functions remains a challenge when implementing Volterra GMP models when utilizing such options/techniques. Therefore, in accordance with at least some embodiments of the present disclosure, additional options/techniques are implemented that significantly reduce this dependency on NL functions and to provide a prerequisite for simpler implementation. In this regard, a modular approach to the implementation of the GMP Equation (5) involves utilizing a self-contained functional block that may be optimized well and then repeated to form a scalable replica. The following part of Equation (5) is common and using Equation (9) may be encapsulated in a parameterized functional block as Equation (12) as follows:

$$\sum_{i=1}^{K} s(n - iT_s) NL_i\{|s(n - iT_E)|\} \qquad (12)$$

That is, Equation (12) constitutes a primary functional block in the scalable implementation of the Equation (5).

Figure 2:
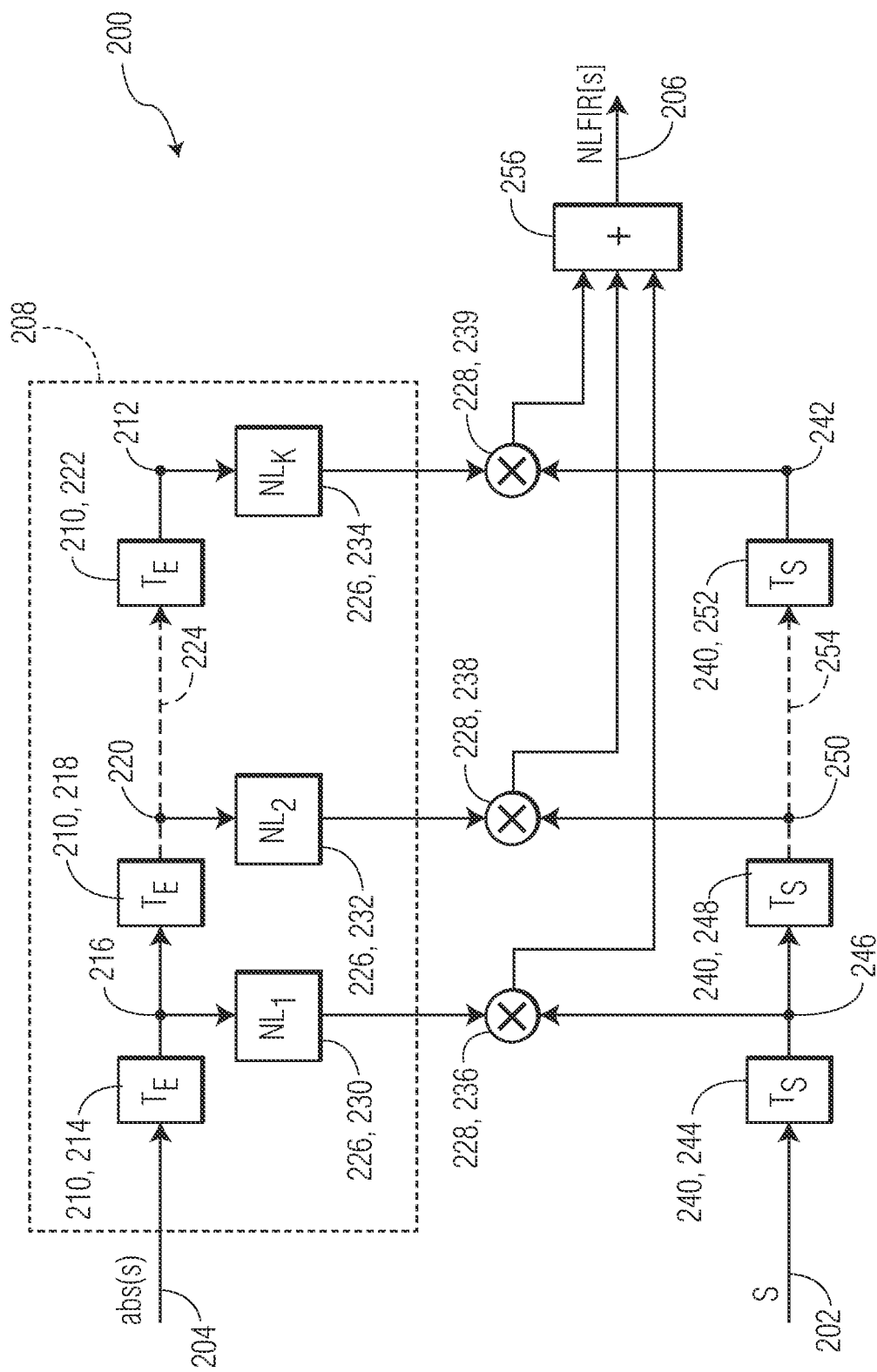
FIGS. 2-7 are block or schematic diagrams illustrating various manners of processing employed to perform DPD, which may be performed by a DPD module of the digital front-end of FIG. 1, in at least one or more embodiments encompassed herein.

Further in this regard, FIG. 2 is a block (or schematic) diagram that illustrates a nonlinear finite impulse response filter structure (NLFIR) 200. The NLFIR 200 describes graphically an arrangement of elementary mathematical operations involved in a physical implementation. The NLFIR configuration parameters include: a baseband signal input s; an envelope input signal abs(s); an array of K nonlinear functions with their descriptions NL (NL: $NL_1$, $NL_2$, ... $NL_K$); a tapped time-delay line for the envelope signal $T_E$; and a tapped time-delay line for the baseband signal $T_S$ ($T_E$ and $T_s$ are the values of the sample delays at each filter tap). These configuration parameters for the NLFIR may be listed as a set, as {s, abs(s), NL, $T_E$, $T_S$}.

More particularly as illustrated, the NLFIR 200 may be viewed as having a first input terminal 202 at which the baseband signal input s is received, a second input terminal 204 at which the envelope input signal abs(s) is received, and an output terminal 206 at which NLFIR output, NLFIR(s), is output. The second input terminal 204 is directly coupled to an array of complex-valued NL functions 208. The array of complex-valued NL functions 208 particularly includes a plurality of first tapped time-delay lines 210 that are coupled in series with one another between the second input terminal 204 and a final time-delay line output node 212. Any number of the tapped time-delay lines 210 may be present depending upon the embodiment and, in this example, the plurality of tapped time-delay lines 210 includes K tapped time-delay lines, where K=3. Each of the tapped time-delay lines 210 is coupled between a respective time-delay line input terminal and a respective time-delay output terminal and provides the time delay $T_E$. It will be appreciated that a first one 214 of the tapped time-delay lines 210 is coupled between the second input terminal 204 and a first one 216 of the time-delay output terminals, a second one 218 of the tapped time-delay lines is coupled between the first one 216 of the time-delay output terminals (which also is the input terminal for that time-delay line) and a second one 220 of the time-delay output terminals, and that a Kth one 222 of the tapped time-delay lines 210 is coupled between the final (Kth) time-delay line output node 212 and a preceding one 224 of the time-delay line output nodes, which may be the second one 220 of the time-delay output terminals if K=3 as shown, but would be another one of the time-delay output terminals if K is greater than 3.

Additionally as shown, the array of complex-valued NL functions 208 also includes a plurality of complex-valued NL (or polynomial) functions 226, which are coupled between the plurality of tapped time-delay lines 210 and a plurality of complex multipliers 228, which in the present illustration are shown to be external of the array of complex-valued NL functions 208. More particularly, each of the complex-valued NL functions 226 is respective coupled between a respective one of the time-delay output terminals of a respective one of the tapped time-delay lines 210 and a respective first input terminal of a respective one of the complex multipliers 228. In the present example in which the first one 214, second one 218, and Kth (third) one 222 of the tapped time-delay lines are shown, FIG. 2 particularly shows a first one 230, a second one 232, and a Kth (third) one 234 of the complex-valued NL functions 226. More particularly, FIG. 2 shows that the first one 230 of the complex-valued NL functions 226 is coupled between the first one 216 of the time-delay output terminals and the respective first input terminal of a first one 236 of the complex multipliers 228, the second one 232 of the complex-valued NL functions is coupled between the second one 220 of the time-delay output terminals and the respective first input terminal of a second one 238 of the complex multipliers, and the Kth one 234 of the complex-valued NL functions is coupled between the final time-delay line output node 212 and the respective first input terminal of a Kth one 239 of the complex multipliers.

Further, the NLFIR 200 also includes a plurality of second tapped time-delay lines 240 that are coupled in series with one another between the first input terminal 202 and a last time-delay line output node 242. Any number of the tapped time-delay lines 240 may be present depending upon the embodiment and, in this example, the plurality of tapped time-delay lines 240 again includes K tapped time-delay lines, where K=3. Each of the tapped time-delay lines 240 is coupled between a respective time-delay line input terminal and a respective time-delay output terminal and provides the time delay $T_S$. It will be appreciated that a first one 244 of the tapped time-delay lines 240 is coupled between the first input terminal 202 and a first one 246 of the time-delay output terminals, a second one 248 of the tapped time-delay lines is coupled between the first one 246 of the time-delay output terminals (which also is the input terminal for that time-delay line) and a second one 250 of the time-delay output terminals, and that a Kth one 252 of the tapped time-delay lines 240 is coupled between the last (Kth) time-delay line output node 242 and a preceding one 254 of the time-delay line output nodes, which may be the second one 250 of the time-delay output terminals if K=3 as shown, but would be another of the time-delay output terminals if K is greater than 3.

Additionally as shown, respective second input terminals of the respective ones of the complex multipliers 228 are respectively coupled to respective ones of the time-delay output terminals of the respective tapped time-delay lines 240. Thus, in the present example in which there are K of the tapped time-delay lines 240 and in which the first one 244, second one 248, and Kth one 252 of the tapped time-delay lines are shown, FIG. 2 particularly shows the first one 246 of the time-delay output terminals, the second one 250 of the time-delay output terminals, and the last time-delay line output node 242 as being coupled respectively to the respective second input terminals of the first one 236, second one 238, and the Kth one 239 of the complex multipliers, respectively. Further based upon the respective pairs of input signals received at each of the respective complex multiplier 228 from the respective complex-valued NL functions 226 and the respective time-delay output terminals of the respective tapped time-delay lines 240, each of the respective complex multipliers 228 performs complex multiplication upon the received pairs of input signals (input samples). Further based upon these calculations, each of the complex multipliers 228 in turn sends a respective output signal for receipt by a summing block 256. The summing block 256 in turn adds all of those received output signals and generates the NLFIR(s) output signal NLFIR(s) at the output terminal 206. More particularly, in the present embodiment in which the first, second, and Kth ones 236, 238, and 239 of the complex multipliers 228 are shown, the summing block 256 is shown to receive respective output signals from those respective complex multipliers, and generates the NLFIR(s) output signal NLFIR(s) at the output terminal 206 based upon those three output signals.

It should be appreciated that the NLFIR 200 arrangement resembles a finite impulse response filter, but is qualitatively different because each filter coefficient is computed in run-time for each sample passing along the array of multiply operations. The coefficient computation itself is done in the NL blocks (the complex-valued NL functions 226), which may be implemented in any of a variety of matters, as described for example above in regard to Equation (9). The implementation and management of the functional block is complicated by the NL operations. In particular, each NL function must be computed for each passing sample before the complex multiplication with the input samples, and the presence of this latter characteristic makes the practical realization of this filter somewhat costly and complicated.

The NLFIR 200 of FIG. 2 may be extended, as a model for performing DPD, to each of the GMP kernels as described above with respect to Equation (5). Indeed, each of the GMP kernels (SP, MP, and CP) may be implemented using an appropriate configuration of the NLFIR. More particularly in this regard, FIG. 3 is a block (or schematic) diagram that illustrates an array 300 of nonlinear finite impulse response filter structures (that is, an array of NLFIRs such as, or similar to, that shown in FIG. 2) In FIG. 3, an index is added to the generic name NLFIR with respect to each NLFIR that is shown in the array 300, to designate the type of kernel with respect to which that respective NLFIR is being implemented, namely, SP as shown in Equation (6), MP as shown in Equation (7), and CT-B (CTB)

or CT-C(CTC) kernels, which are two types of kernels that more generally are encompassed by the CP of Equation (8).

Figure 3:
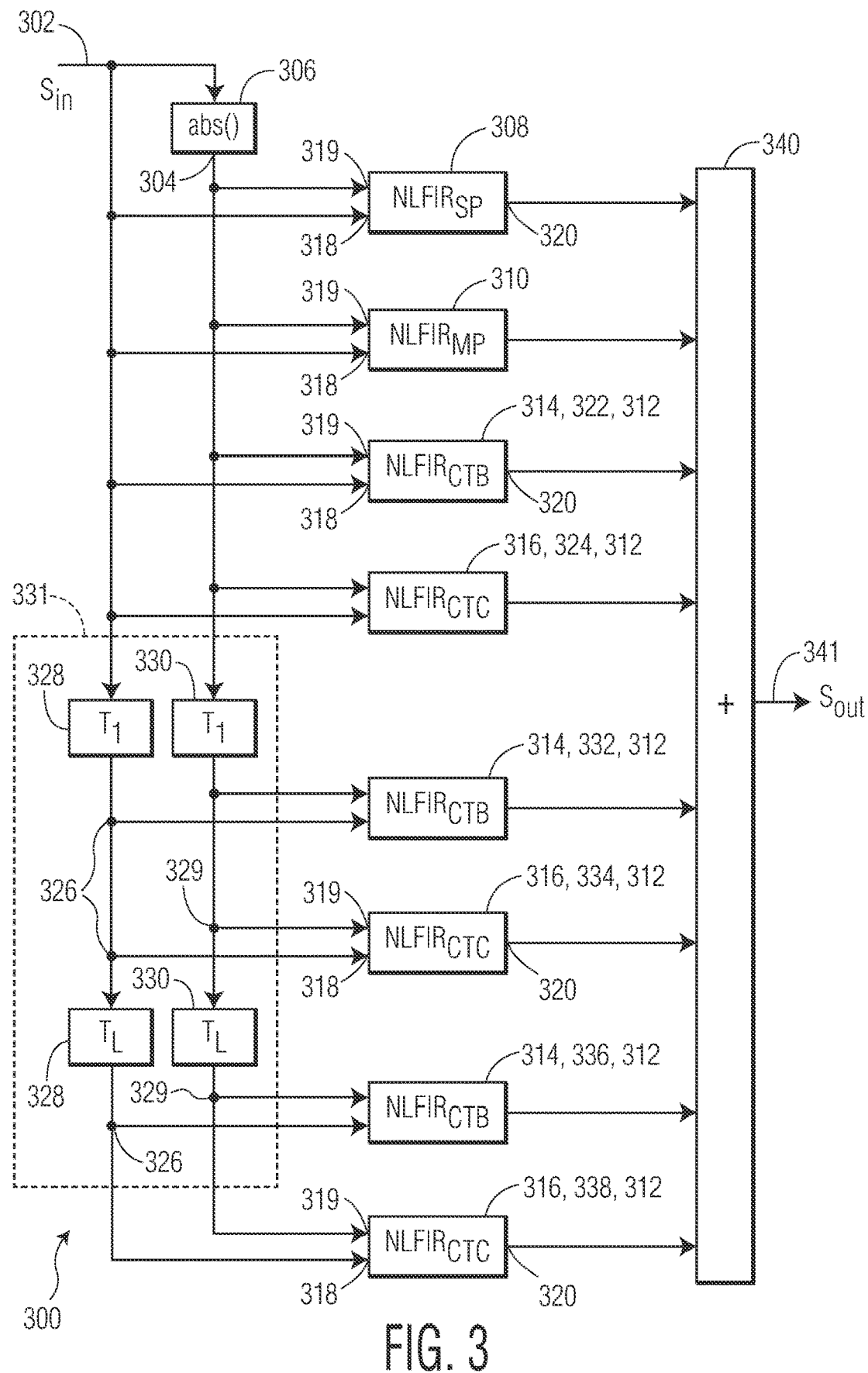

As with the NLFIR 200 of FIG. 2, the array 300 of NLFIRs of FIG. 3 includes an input terminal 302 at which the baseband signal input s (or $S_{in}$) is received. Also, FIG. 3 shows provision of the envelope input signal abs(s). In this illustration, the envelope input signal abs(s) is shown to be generated based upon the baseband signal input s, at an intermediate input terminal 304, by an envelope input block 306 positioned between the input terminal 302 and the intermediate input terminal. Additionally as shown, the array 300 particularly includes a first NLFIR 308 ($NLFIR_{SP}$), which is directed to the SP, and a second NLFIR 310 ($NLFIR_{MP}$), which is directed to the MP. Further, the array 300 also includes a plurality of third NLFIRs 312 that are respectively directed to the CP. The plurality of third NLFIRs 312 include a plurality of fourth NLFIRs 314 ($NLFIR_{CTB}$), which respectively are directed to the CT-B kernels (of the CP), and a plurality of fifth NLFIRs 316 ($NLFIR_{CTC}$), which respectively are directed to the CT-C kernels (also of the CP). In the present example, there are L+1 (or Q) of the fourth NLFIRs 314, and L+1 (or R) of the fifth NLFIRs 316.

Each of the first, second, and third NLFIRs 308, 310, and 312 (and fourth and fifth NLFIRs 314 and 316) has a respective first input terminal 318, a respective second input terminal 319, and a respective output terminal 320. Each of the respective first input terminals 318 of each of the first and second NLFIRs 308 and 310, as well as first ones 322 and 324 of the fourth NLFIRs 314 and fifth NLFIRs 316, is coupled to the input terminal 302 to receive the baseband signal input s, and each of the respective second input terminals 319 of each of the first and second NLFIRs 308 and 310, as well as the first ones 322 and 324 of the fourth NLFIRs 314 and fifth NLFIRs 316, is coupled to the intermediate input terminal 304 to receive the envelope input signal abs(s). By contrast, in this embodiment, the respective first input terminals 318 of the fourth NLFIRs 314 and fifth NLFIRs 316 other than the first ones 322 and 324 are successively coupled to successive first time-delay output terminals 326 of respective first tapped time-delay lines 328. The first tapped time-delay lines 328 are series-coupled to one another and to the input terminal 302, and respectively provide time delays of $T_1$ through $T_L$. Also, the respective second input terminals 319 of the fourth NLFIRs 314 and fifth NLFIRs 316 other than the first ones 322 and 324 are successively coupled to successive second time-delay output terminals 329 of respective second tapped time-delay lines 330. The second tapped time-delay lines 329 are series-coupled to one another and to the intermediate input terminal 304, and respectively provide time delays of $T_1$ through $T_L$. All of the first and second tapped time-delay lines 328 and 330 are illustrated in FIG. 3 as being provided within a tapped delay-line section 331.

Thus, the respective first input terminals 318 of each of a second one 332 of the fourth NLFIRs 314 and a second one 334 of the fifth NLFIRs 316 are both coupled to a first one of the first time-delay output terminals 326, and correspondingly coupled to the input terminal 302 by way of a first one of the first tapped time-delay lines 328 providing the time delay of $T_1$. Further, the respective first input terminals of each of a final one 336 of the fourth NLFIRs 314 and a final one 338 of the fifth NLFIRs 316 are both coupled to a final one of the first time-delay output terminals 326, and correspondingly coupled to the input terminal 302 by way of all of the first tapped time-delay lines 328 coupled in series with one another. In the example shown, the final one of the first time-delay output terminals 326 is coupled to a preceding one of the first time-delay output terminals by way of a final one of the first tapped time delay lines 328 providing the time delay of $T_L$. Because in this example the preceding one of the first time-delay output terminals happens to be the same as the first one of the first tapped time-delay terminals 326 to which the second ones 332, 334 of the fourth and fifth NLFIRs are coupled, there are only two of the first tapped time-delay lines 328 in this example. Nevertheless, in other embodiments, there are more than two of the first tapped time-delay lines 328 and correspondingly more than three of each of the fourth NLFIRs 314 and fifth NLFIRs 316.

Additionally, the respective second input terminals 319 of each of the second one 332 of the fourth NLFIRs 314 and the second one 334 of the fifth NLFIRs 316 are both coupled to a first one of the second time-delay output terminals 329, and correspondingly coupled to the intermediate input terminal 304 by way of a first one of the second tapped time-delay lines 330 providing the time delay of T1. Further, the respective second input terminals 319 of each of the final one 336 of the fourth NLFIRs 314 and the final one 338 of the fifth NLFIRs 316 are both coupled to a final one of the second time-delay output terminals 329, and correspondingly coupled to the intermediate input terminal 304 by way of all of the second tapped time-delay lines 330 coupled in series with one another. In the example shown, the final one of the second time-delay output terminals 329 is coupled to a preceding one of the second time-delay output terminals by way of a final one of the second tapped time delay lines 330 providing the time delay of $T_L$. Because in this example the preceding one of the second time-delay output terminals happens to be the same as the first one of the second tapped time-delay output terminals 329 to which the second ones 332, 334 of the fourth and fifth NLFIRs are coupled, there are only two of the second tapped time-delay lines 330 in this example. Nevertheless, in other embodiments, there are more than two of the second tapped time-delay lines 330 and correspondingly more than three of each of the fourth NLFIRs 314 and fifth NLFIRs 316.

Referring still to FIG. 3, it should be additionally recognized that each of the output terminals 320 of each of the NLFIRs 308, 310, 312 (including 314 and 316) are all coupled to a summation block 340, at which output signals from all of those NLFIRs are added together so as to generate an overall output signal $S_{out}$ for the array 300 at an output port 341 of the summation block. Also, it should be noted that the array 300 of NLFIRs shown in FIG. 3 employs NLFIRs that are configured in accordance with particular parameters. In particular, in the present example, the first NLFIR 308 has the following parameters: SP: $NL=NL_1$, TE=TS=0. Also, the second NLFIR 310 has the following parameters: MP: $NL=NL_1 \ldots NL_M$, TE=TS. Further, each of the fourth NLFIRs 314 has the following parameters: CT-B: $NL=NL_1 \ldots NL_Q$, TE, TS=0. Also, each of the fifth NLFIRs 316 has the following parameters: CT-C: $NL=NL_1 \ldots NL_R$, TE=0, $T_S$. With such appropriate configurations in place, the array 300 of NLFIRs produces the same output as Equation (5) and may be used to model nonlinear behavior with excellent accuracy. Additionally, notwithstanding the example parameters described above for the first NLFIR 308, second NLFIR 310, fourth NLFIRs 314, and fifth NLFIRs 316, it should be also understood that these parameter values are only examples and, in other embodiments, one or more of these parameters can have one or more other values. Further for example, in some other embodiments, with respect to the fourth NLFIRs 314. TS may have a different value than zero and/or, with respect to the fifth NLFIRs 316, TE may have a different value than zero.

Performing DPD through the use of the array 300 of NLFIRs of FIG. 3 may achieve significant advantages, including flexibility, scalability and nonlinear capability. However, the array 300 is complex to implement, and may entail a high level of maintenance to ensure pruned model performance. Indeed, the number of NLFIR blocks in the model leads to a proportional increase of complexity of run-time execution as well as the identification of the NL functions (coefficients) of each filter when the filters have a long time span to model complex memory effects. Pruning reduces the complexity by minimizing the polynomial order of the NL functions P as well as the depth L of the cross terms, which are often eliminated altogether. Indeed, the CT-B/C NLFIRs attached to the tapped delay line and the tapped delay line itself are removed. The numbers of CTB and CTC NLFIRs (e.g., the numbers of fourth NLFIRs 314 and fifth NLFIRs 316) need not be the same; rather, R is usually much smaller than Q, because the cross-term C kernels have a lesser effect and their NLFIR has a short time span. Often the Volterra GMP model is pruned to the top 3-4 NLFIRs after tradeoffs with performance. Additionally, the polynomial (nonlinear) order is kept to at least at 3 which demands the full functionality of the NL blocks inside the NLFIRs (e.g., the complexity of the primary block remains significant regardless of the pruning). Regardless of the pruning effort, the NL functions remain in place and contribute to costlier implementation in terms of power consumption and area or time to compute. Further, the effort to identify the NL functions adaptively is another issue which is proportional to the overall complexity associated with the order of the NL functions and their total number. The need to identify numerous NL functions reduces the speed of updates and/or lowers the accuracy of the model in cases where a high order of nonlinearity is utilized.

Figure 4:
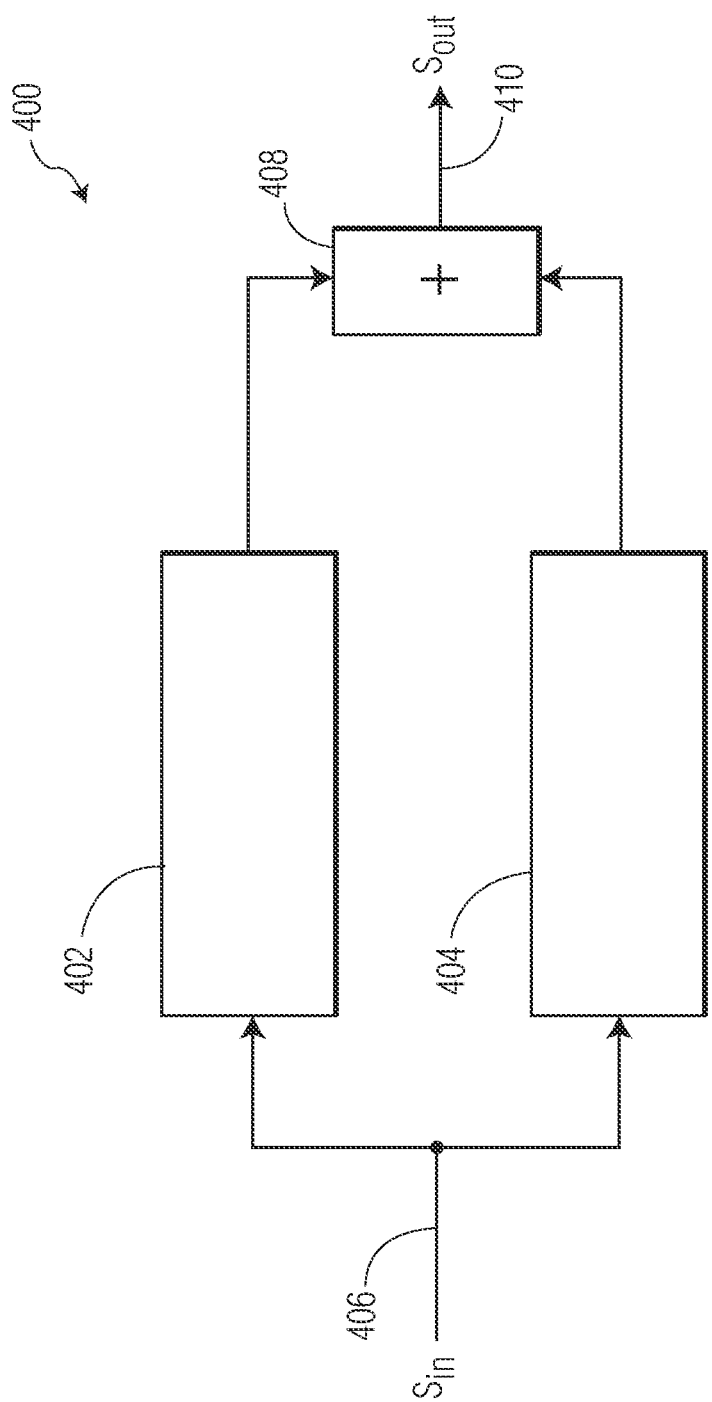

In view of the above considerations, in accordance with at least some embodiments of the present disclosure, the present disclosure encompasses additional options/techniques for implementing Volterra GMP models for DPD in relation to PAs in which linear filters are employed as primary blocks, instead of nonlinear filters. More particular, in at least some such embodiments, nonlinear envelope modulators are employed for behavioral modeling of broadband memory. Further in this regard, FIG. 4 is a block diagram 400 illustrating an example of such a nonlinear model (employing the nonlinear envelope modulators). As illustrated, the nonlinear model represented by the block diagram 400 is divided into two types of kernels, namely, main distortion and nonlinear memory kernels, as follows: a single nonlinear functional block 402 is only used in the main distortion kernel; and the nonlinear memory kernel uses an array of linear finite impulse response (FIR) filters, as represented by an additional block 404. Each of respective input terminals of the nonlinear functional block 402 and additional block 404 are coupled to an input terminal 406 to receive, as an input signal, the baseband signal input $S_{in}$. Also respective output terminals of each of the nonlinear functional block 402 and additional block 404 are coupled to a summation block 408, which adds the output signals from those two blocks and in turn generates and outputs an overall output signal Sous at an output terminal 410.

In the model represented by the block diagram, the main distortion kernel associated with the nonlinear functional block 402 implements the functionality of the static polynomial (SP) of arbitrary order (for example, zero order or other low order such as first order) and the memory polynomial (MP) of order 0 from the GMP model represented by Equation (5) (although this example envisions MP of order 0, the present disclosure also encompasses other embodiments having MP of other low orders). The purpose of the main distortion kernel is to approximate the instantaneous AM-xM curves and the passband ripple of the PA. As for the nonlinear memory kernel corresponding to the additional block 404, this kernel implements the functionality of the MP of order 1 and the CT-B and CT-C(CP) of order 1 from the GMP model of Equation (5) by way of a nonlinear envelope modulator (NLMOD). By implementing the nonlinear memory kernel (and particularly the NLMOD thereof) using FIR filters, the nonlinear memory kernel (and particularly the NLMOD thereof) is able to describe and visualize complex memory effects including resonances, which makes it possible for the nonlinear memory kernel (and particularly the NLMOD thereof) to approximate the bias circuits and the die (e.g., of the PA).

Figure 5:
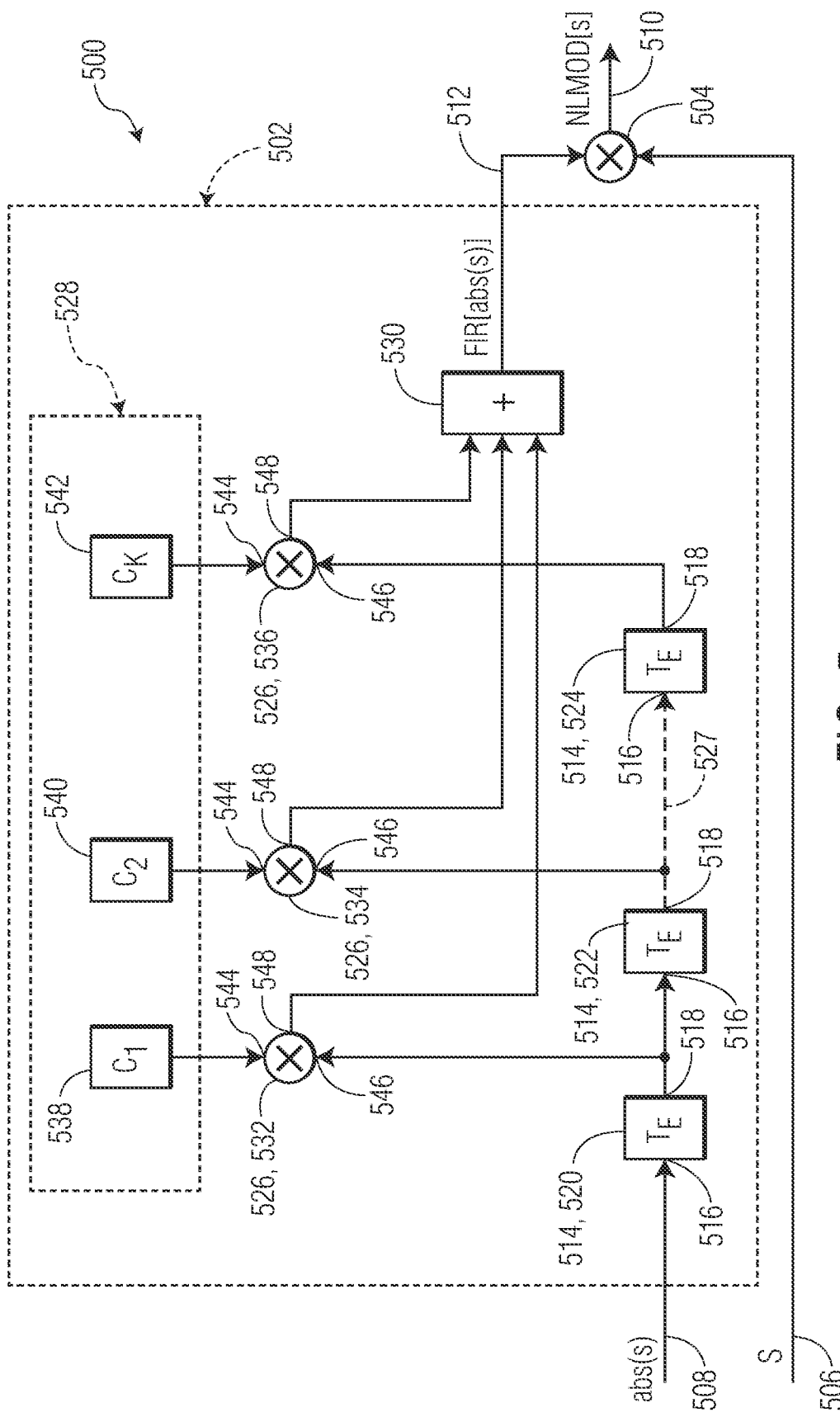

Referring additionally to FIG. 5, a further block diagram illustrates a NLMOD 500 that is, or is the primary functional block of, the nonlinear memory kernel corresponding to the additional block 404 of FIG. 4. As shown, the NLMOD 500 includes a linear FIR filter 502 and a complex-valued multiplier 504. Further, the NLMOD 500 includes a first input terminal 506 at which the baseband signal input s (or $S_{in}$) is received (and that may be considered to be the same input terminal as the input terminal 406 of FIG. 4), a second input terminal 508 at which the envelope input signal abs(s) is received, and an output terminal 510 at which the NLMOD provides an output signal, NLMOD[s]. Although shown as two distinct input signals in FIG. 5, it should be appreciated (e.g., from the discussion regarding FIG. 3) that the envelope input signal abs(s) may be generated or derived based upon the baseband signal input s, by an envelope input block such as the envelope input block 306 of FIG. 3 (which is not shown in FIG. 5). The complex-valued multiplier 504 has two input ports, the first of which is directly coupled to (and forms the same node as) the first input terminal 506, and the second of which is directly coupled to (and forms the same node as) an intermediate output port 512 of the linear FIR filter 502. It will be understood that the baseband signal input s received at the first input terminal 506 is a complex-valued baseband signal, that the envelope input signal abs(s) received at the second input terminal 508 is a real-valued envelope signal, and that the output signal NLMOD[s] provided at the output terminal 510 is a complex-valued modulated baseband sample signal.

The linear FIR filter 502 particularly includes a plurality of first tapped time-delay lines 514 that are coupled in series with one another. Each of the first tapped time-delay lines 514 respectively extends between a respective time-delay line input terminal (or port or node) 516 and a respective time-delay line output terminal (or port or node) 518, and provides a time delay (or unit tap delay) $T_E$. Any number of the first tapped time-delay lines 514, and associated input and output terminals 516 and 518, may be present depending upon the embodiment. In this example, first, second, and third ones 520, 522, and 524 of the first tapped time-delay lines 514 are expressly shown, although the illustration provided is intended to be representative of arrangements in which any number K (e.g., more than three) of such tapped time-delay lines is present, as indicated by a dashed line 527 coupling second and third ones of the tapped time-delay lines. Given this arrangement, the respective time-delay input terminal 516 of the first one 520 of the first tapped time-delay lines 514 is directly coupled to (and forms the same node as) the second input terminal 508, and the respective time-delay output terminal 518 of the third one 524 of the first tapped time-delay lines is a final one of those output terminals (positioned electrically farthest from the second input terminal 508). In the present embodiment, the respective time delay input terminal 516 of the second one 522, and the respective time delay output terminal 518 of the first one 520 of the first tapped time-delay lines 514 are directly coupled with one another (and constitute the same node). Also in the present embodiment, the respective time delay input terminal 516 of the third one 524, and the respective time delay output terminal 518 of the second one 522 of the first tapped time-delay lines 514 are directly coupled with one another (and constitute the same node).

Further as shown, the linear FIR filter 502 additionally includes a plurality of complex multipliers 526, a set of complex-valued coefficients 528, and a summation block 530. In the present embodiment, the plurality of complex multipliers 526 includes a respective complex multiplier corresponding to each respective one of the first tapped time-delay lines 514, and also the set of complex-valued coefficients 528 includes a respective complex-valued coefficient corresponding to each respective one of the first tapped delay lines 514 (and thus also corresponding to each respective one of the complex multipliers 526). Thus, in the present example, the plurality of complex multipliers 526 includes first, second, and third ones 532, 534, and 536, respectively, of the complex multipliers. Likewise, in the present embodiment, the set of complex-valued coefficients 528 includes first, second, and third ones 538, 540, and 542, respectively, of the complex-valued coefficients, $C_1$, $C_2$, and $C_K$ (where K=3 in this example). Although the present example of FIG. 3 shows the linear FIR filter 502 as having three of each of the first tapped time-delay lines 514, the complex multipliers 526, and the complex-valued coefficients 528, again in other embodiments any other numbers of each of those components may be present (e.g., more than 3, with K>3).

Additionally with respect to the linear FIR filter 502, each of the complex multipliers 526 has a respective first input port 544, a respective second input port 546, and a respective output port 548. The respective first input port 544 of each respective one of the complex multipliers 526 is coupled to a respective one of the complex-valued coefficients 528. That is, in the present example, the respective first input ports 544 of the first, second, and third ones 532, 534, and 536, respectively, of the complex multipliers 526 is coupled directly to the respective first, second, and third ones 538, 540, and 542, respectively, of the complex-valued coefficients 528 (and thus receives a corresponding one of the coefficients $C_1$ to $C_K$). Also, the respective second input port 546 of each respective one of the complex multipliers 528 is coupled to a respective one of the time-delay output terminals 518 of the respective first tapped time-delay lines 514. That is, in the present example, the respective second input ports 546 of the first, second, and third ones 532, 534, and 536, respectively, of the complex multipliers 526 is coupled directly to the respective time-delay output terminals 518 of the first, second, and third ones 520, 522, and 524, respectively, of the first tapped time-delay lines 514 (and thus receives a time-delayed version of the envelope input signal abs(s)).

Further, each of the output ports 548 of each of the first, second, and third ones 532, 534, and 536, respectively, of the complex multipliers 526 is coupled directly to the summation block 530. The summation block 530 sums the signals received from the first, second, and third ones 532, 534, and 536 of the complex multipliers 526 and then outputs that sum (or a signal based upon that sum) as a linear FIR filter output signal FIR[abs(s)] at the intermediate output port 512. In turn, the complex-valued multiplier 504 of the NLMOD complex multiplies that signal received from the intermediate output port 512 by the baseband signal input s received from the first input terminal 506 to generate the output signal NLMOD[s] at the output terminal 510. In this manner, therefore, the NLMOD 500 with the linear FIR filter 502 particularly utilizes the complex-valued coefficients 528 that are connected to the complex-valued multiplier to generate the output signal NLMOD[s], and operation of the NLMOD 500 particularly is influenced by the configuration parameter set that includes the input signals (s and abs(s)), the complex-valued coefficients 528 of the linear FIR filter (or filters) ($C_1$ to $C_K$), and the unit tap-delay $T_S$ of the linear FIR filter.

Performing DPD utilizing the NLMOD 500 described in regard to FIG. 4 and FIG. 5 is advantageous by comparison with performing DPD utilizing the NLFIRs described above (e.g., as shown in FIG. 3), in various respects. A significant advantage associated with utilizing the NLMOD 500 (e.g., the block shown in FIG. 5) is that it is relatively simple to implement, in terms of computational simplicity, by comparison with utilizing the NLFIRs. Although implementation of the NLFIRs as described above may be somewhat more consistent conceptually with the GMP architecture described in regard to Equation (5) than implementation of the NLMOD 500, the NLMOD is computationally simpler to implement insofar as: (a) the NLMOD does not employ or require NL functions; (b) the NLMOD employs 50% less multiplication operations than that NLFIR; and (c) the NLMOD employs up to 50% less delay elements than the NLFIR. Correspondingly, using the same implementation resources, the NLMOD 500 may have a time span that is two times longer, and provides better dynamic accuracy (frequency resolution, memory approximation), by comparison with a GMP NLFIR.

Figure 6:
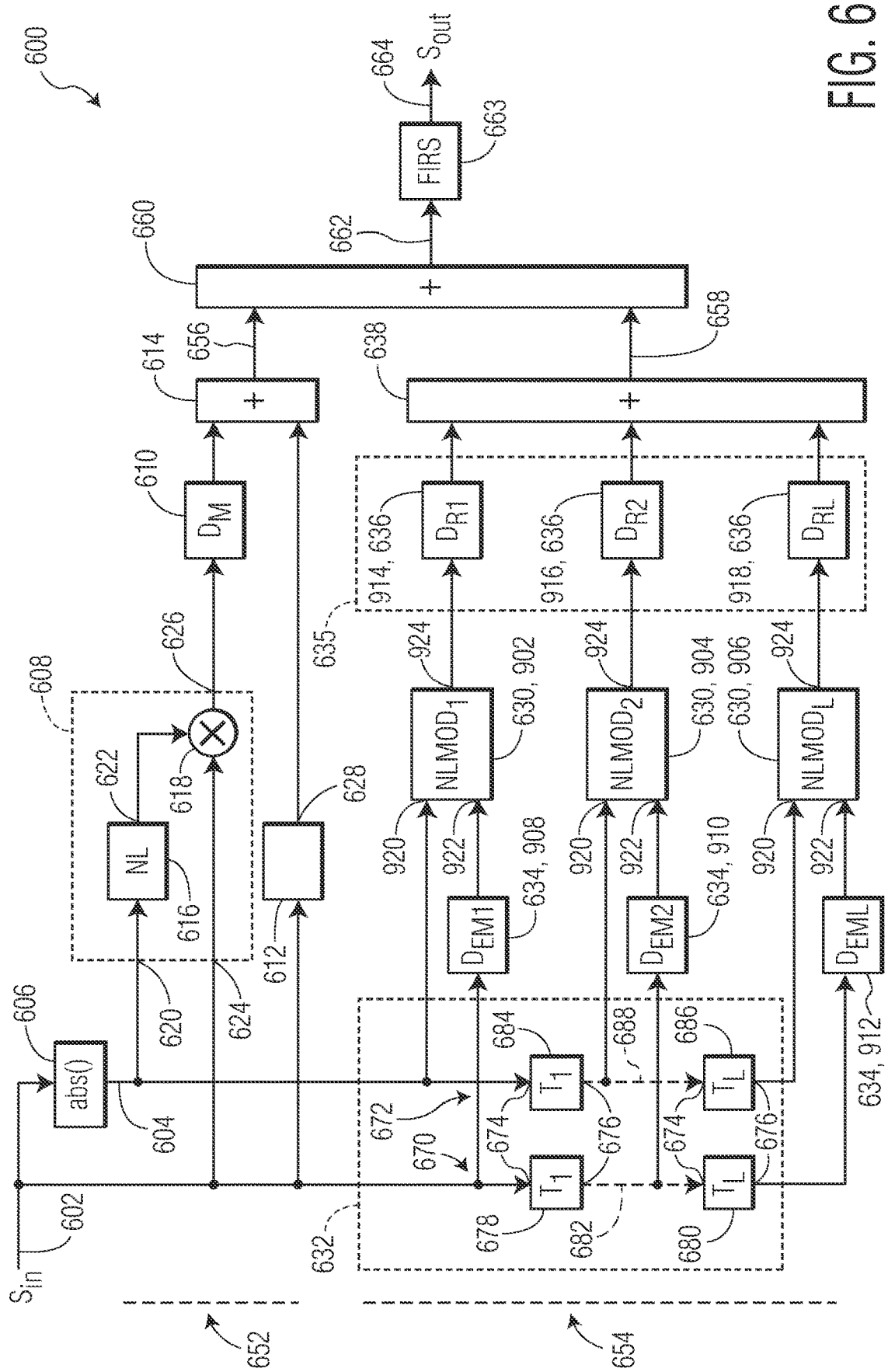

Turning next to FIG. 6, in at least some additional embodiments encompassed herein, DPD processing or broadband behavior modeling is performed by an array of nonlinear modulators such as the NLMOD 500 of FIG. 5. In this regard, FIG. 6 is a block (or schematic) diagram that illustrates a model architecture 600 in which multiple NLMODs of the form of the NLMOD 500 are employed in addition to a single NL block (e.g., utilizing an NLFIR as described above in regard to FIG. 2). In FIG. 6, the model architecture 600 includes an input terminal 602 at which the baseband signal input s (or $S_{in}$) is received. Also, the envelope signal input abs(s) is shown to be generated based upon the baseband input s, at an intermediate input terminal 604, by an envelope input block 606 positioned between the input terminal 602 and the intermediate input terminal 604. The baseband signal input s and the envelope input signal abs(s) constitute inputs to both a main distortion section 652 and a nonlinear memory section 654 of the model architecture 600, which respectively correspond to the blocks 402 and 404, respectively, of FIG. 4.

Further, respective output signals output at a main distortion section output port 656 of the main distortion section 652 and at a nonlinear memory section output port 658 of the nonlinear memory section 654 are received at two respective input ports of a summation block 660, which corresponds to the summation block 408 of FIG. 4. The summation block 660 sums the two output signals received from the main distortion section output port 656 and the nonlinear memory section output port 658 and generates an intermediate output signal that is the sum of those two output signals (or that is based upon that sum) at an intermediate output terminal 662. The intermediate output terminal 662 is in turn coupled to an input port of a linear FIR filter (FIRS) 663, which receives the intermediate output signal and in turn generates and outputs at an output port 664 an overall output signal for the entire model architecture 600, $S_{out}$. The purpose of the linear FIR filter (FIRS) 663 is to perform bandwidth limiting of the output sample when the sampling rate of the DPD is not a larger multiple of the instantaneous signal bandwidth (BW). (Any bandwidth limiting value may be used depending upon the embodiment—one example, which is not intended to be limiting, would be a two-times bandwidth limiting value.)

Additionally as shown, the main distortion section 652 particularly includes a first NLFIR 608 (NLFIR$_{SP}$ for AM-xM), which is directed to the SP, a delay block 610 providing a delay $D_M$, a non-causal linear finite impulse response filter (FIRE) block 612, and a first summation block 614 having an output port that constitutes the main distortion section output port 656. The first NLFIR 608 includes a NL block 616 and a complex multiplier 618. More particularly, a NLFIR input port 620 of the first NLFIR 608, which is also the input port of the NL block 616, is coupled to the second input terminal 604 to receive the envelope signal input abs(s). An output port 622 of the NL block 616 is coupled as one of two inputs to the complex multiplier 618. A second NLFIR input port 624 of the first NLFIR 608, which is coupled to the input terminal 602 to receive the baseband signal input s, constitutes the second of the two inputs to the complex multiplier 618. The complex multiplier 618 in turn serves to multiply the output of the NL block 616 with the baseband signal input s. Further, the delay block 610 is coupled to an NLFIR output port 626, which is also the output port of the complex multiplier 618, and operates to delay the output signal received from the complex multiplier 618 before outputting the delayed output signal for receipt by the first of two input ports of the first summation block 614. By comparison, the FIRE block 612 is coupled to the input terminal 602 to receive the baseband input signal $S_{in}$ and, upon processing that signal, outputs a further processed output signal at a FIRE block output port 628 for receipt by the second of two input ports of the summation block 614. The summation block 614 in turn outputs, at the main distortion section output port 656, a signal indicative of the sum of (or based upon the sum of), the delayed output signal from the delay block 610 and the processed output signal from the FIRE block 612.

It should be appreciated that the NL block 616 (which is the only NL block in the model architecture 600), which is part of the main distortion section 652, has the same purpose as the NLFIR$_{SP}$ from the GMP model, and approximates the instantaneous AM-AM & AM-PM curves of the PA or their inverses. Further, the FIRE block 612, which is a non-causal linear finite impulse response filter of complex-valued coefficients, operates to model the ripple or the inverse ripple of the PA. There are performance advantages in using up to 50% of the taps in FIRE to operate on "future" samples. The delay block 610 with the delay $D_M$ aligns the AM-xM model with the instantaneous center of FIRE, based upon the following: (a) the length(FIRE) is measured in number of taps (samples); $D_M$ is the non-causal memory depth (the number of "future" samples in the filter); and $D_M \leq$ length (FIRE)/2 for practical reasons and physical considerations, Additionally, the nonlinear memory section (or kernel) 654 includes a plurality of NLMODs 630, a tapped delay line section 632, a plurality of first additional delay blocks 634, a sample alignment section 635 including a plurality of second additional delay blocks 636, and a second summation block 638. As shown in FIG. 6, the tapped delay line section 632 includes a plurality of first tapped time-delay lines 670 that are coupled in series with one another, beginning at the input terminal 602, and also a plurality of second tapped time-delay lines 672 that are coupled in series with one another, beginning at the intermediate input terminal 604. Each of the first tapped time-delay lines 670 and the second tapped time-delay lines 672 respectively extends between a respective time-delay line input terminal (or port or node) 674 and a respective time-delay line output terminal (or port or node) 676. The respective tapped time-delay lines 670 and 672 are shown to provide respective time delays (or unit tap delays) $T_1$ to $T_L$, where those time delays may take on the same or individually-configured values for each of the respective tapped time-delay lines. Any number of the first tapped time-delay lines 670, and any number of the second tapped time-delay lines 672, and associated input and output terminals 674 and 676, may be present depending upon the embodiment.

In this example, first and second ones 678 and 680 of the first tapped time-delay lines 670 are expressly shown, although the illustration provided is intended to be representative of arrangements in which any number L+1 (e.g., more than two) of such tapped time-delay lines is present, as indicated by a dashed line 682 coupling the first and second ones of the tapped time-delay lines. Likewise, first and second ones 684 and 686 of the second tapped time-delay lines 672 are expressly shown, although the illustration provided is intended to be representative of arrangements in which any number L+1 (e.g., more than two) of such tapped time-delay lines is present, as indicated by a dashed line 688 coupling the first and second ones of the tapped time-delay lines. Given this arrangement, the respective time-delay input terminal 674 of the first one 678 of the first tapped time-delay lines 670 is coupled to the input terminal 602 so as to receive the baseband signal input $S_{in}$, and the respective time-delay input terminal 674 of the first one 684 of the second tapped time-delay lines 672 is coupled to the intermediate input terminal 604 so as to receive the envelope signal input abs(s). Additionally, the respective time-delay input terminal 674 of the second one 680 of the first tapped time-delay lines 670 is directly coupled to (and forms the same node as) the respective time-delay output terminal 676 of the first one 678 of those time-delay lines. Likewise, the respective time-delay input terminal 674 of the second one 686 of the second tapped time-delay lines 672 is directly coupled to (and forms the same node as) the respective time-delay output terminal 676 of the first one 684 of those time-delay lines.

Further as shown, the plurality of NLMODs 630 includes first, second, and third ones 902, 904, and 906, respectively, the plurality of first additional delay blocks 634 includes first, second, and third ones 908, 910, and 912, respectively, and the plurality of second additional delay blocks 636 includes first, second, and third ones 914, 916, and 918, respectively. Each of the NLMODs 630 includes respective first and second input ports 920 and 922, respectively, and also a respective output port 924. As shown, the first input port 920 of the first one 902 of the NLMODs 630 is coupled to the intermediate input port 604, the first one 908 of the first additional delay blocks 634 is coupled between the input terminal 602 and the second input port 922 of that NLMOD, and the first one 914 of the second additional delay blocks 636 is coupled between the output port 924 of that NLMOD and the second summation block 638.

By comparison, the respective first input ports 920 of the second one 904 and third one 906 of the NLMODs 630 are respectively coupled to the respective output ports 676 of the first one 684 and second one 686 of the second tapped time-delay lines 672. Further, the second one 910 and third one 912 of the first additional delay blocks 634 are respectively coupled between the respective output ports 676 of the first one 678 and second one 680 of the first tapped time-delay lines 670, respectively, and the respective second input ports 922 of the second one 904 and third one 906 of the NLMODs 630. Additionally, the second one 916 and third one 918 of the second additional delay blocks 636 are respectively coupled between the respective output ports 924 of the second one 904 and third one 906 of the NLMODs 630 and the second summation block 638. The second summation block 638 in turn outputs, at the nonlinear memory section output port 658, a signal indicative of the sum of (or based upon the sum of), the three output signals output by the first, second, and third ones 902, 904, and 906 of the NLMODS 630, as respectively delayed by the first, second, and third ones 914, 916, and 918 of the second additional delay blocks 636.

It should be appreciated that, in the model architecture 600 of FIG. 6, the nonlinear memory kernel (e.g., the nonlinear memory section 654) is composed of time-delayed nonlinear modulators. The time offsets are provided by tapped delay lines with individually configured delays $T_1 \ldots T_L$. In this example, the respective first, second, and third ones 902, 904, and 906 of the NLMODs 630 may serve as envelope modulators respectively at a reference time of 0, a time offset $T_1$, and a time offset sum $(T_1 \ldots T_L)$. Also, each NLMOD block (e.g., each of the first, second, and third ones 902, 904, and 906 of the NLMODs 630) may have a respective different length FIR filter inside. The FIR filters may be non-causal with $D_{EM1} \ldots D_{EML}$ future samples in each, respectively. In order to align the NLMOD and FIRE filter outputs, the sample alignment section 635 is added that provides a sample alignment array of delay elements (e.g., the second additional delay blocks 636) having delays $D_{R1} \ldots D_{RL}$ (these account for the difference between the non-causal offsets of FIRE and NLMOD). In this regard, it should be understood that, in at least some embodiments: (a) $D_{EMi}$ is the non-causal memory depth (the number of "future" samples in the filter), and $D_{EMi}$ is also the memory depth of the CT-C kernels (cross-terms of type C); (b) $D_{EMi}+D_{Ri}=D_M$, assuming $D_{EMi}<=D_M$; (c) $D_{EMi}<=$length $(NLMOD_i)/2$ for practical reasons and physical considerations; (d) if the non-causality of the NLMOD filters is larger, the FIRE must be re-aligned; and (e) in practice, rarely $D_{EMi}$ is greater than 3. Further, it should also be appreciated that, in at least some embodiments, the FIR filters in this architecture may be polyphase and the conversion of the nonlinear model into a subsampled or reduced-rate one using polyphase techniques is straightforward.

Figure 7:
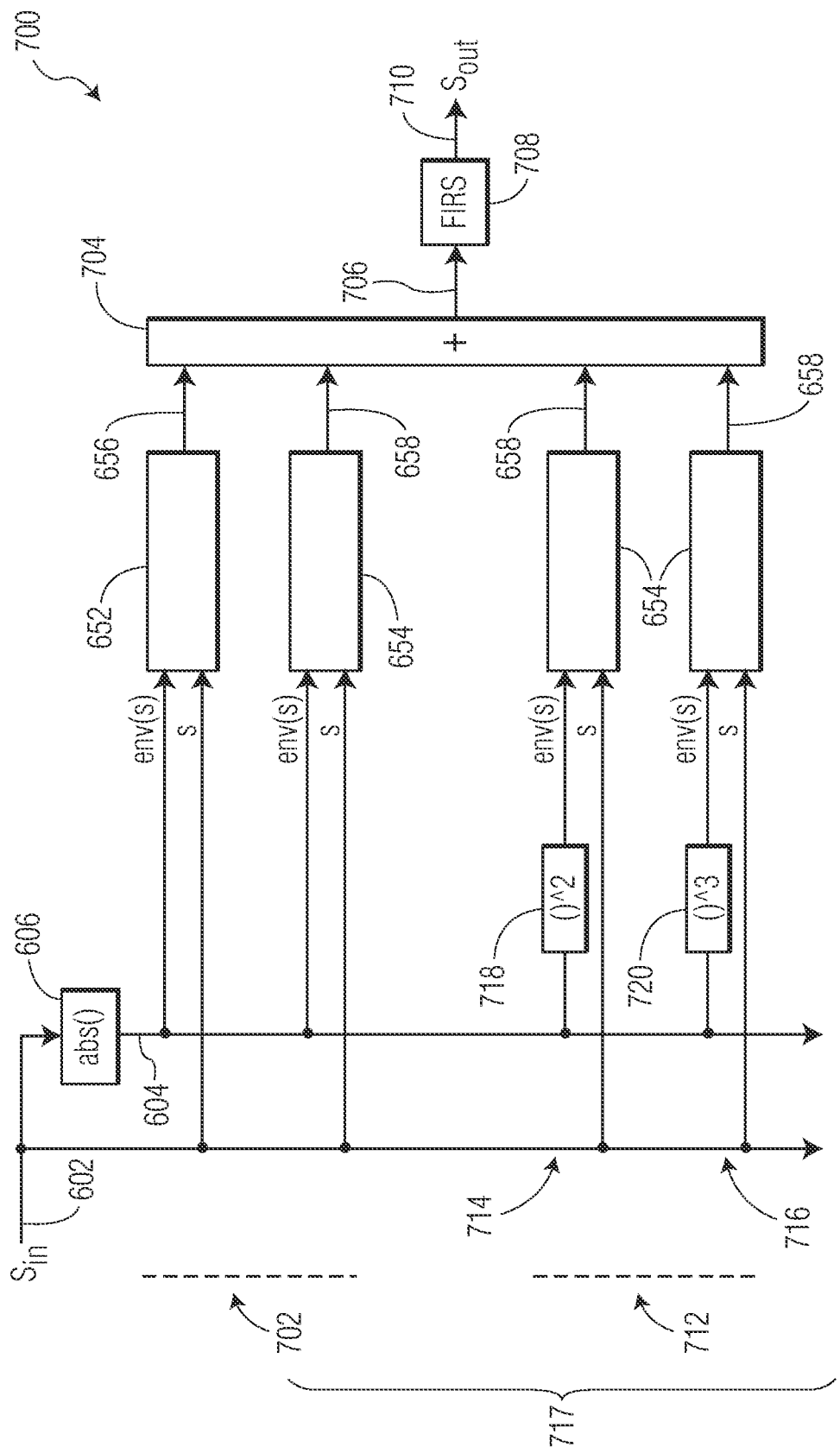

In additional embodiments encompassed herein, the model architecture 600 of FIG. 6 (which may be considered an envelope modulator array architecture) may be modified and scaled so as to include higher order nonlinear memory effects. In this regard, FIG. 7 is a block diagram that shows an example of a model architecture 700 that is scaled so as to include higher order—particularly squared and cubic—effects. More particularly, the model architecture 700 again includes the input terminal 602 at which the baseband signal input s (or $S_{in}$) is received. Also, the envelope signal input abs(s) again is shown to be generated based upon the baseband input s, at the intermediate input terminal 604, by the envelope input block 606 positioned between the input terminal 602 and the intermediate input terminal 604. Also, the model architecture 700 includes a first order distortion section 702 that includes each of the main distortion section 652 (directed to AM-xM and ripple) and the nonlinear memory section 654 (directed to MP and CT-B and CT-C of order 1) of the model architecture 600.

Additionally, the respective output signals output from the main distortion section output port 656 of the main distortion section 652 and the nonlinear memory section output port 658 of the nonlinear memory section 654 are received at two respective input ports of a summation block 704, which corresponds to the summation block 660 of FIG. 6. The summation block 704 sums the two output signals received from the main distortion section output port 656 and the nonlinear memory section output port 658, as well as several other output signals as discussed below, and generates an intermediate output signal that is the sum of those output signals (or that is based upon that sum) at an intermediate output terminal 706. As with the model architecture 600 of FIG. 6, in the model architecture 700 the intermediate output terminal 706 is in turn coupled to an input port of a linear FIR filter (FIRS) 708, which receives the intermediate output signal and in turn generates and outputs at an output port 710 an overall output signal for the entire model architecture 700, $S_{out}$. Again, the purpose of the linear FIR filter (FIRS) 708 is to perform bandwidth limiting of the output sample (e.g., when the sample rate of the model is not more than two times greater than the instantaneous signal BW).

In contrast to the model architecture 600, the model architecture 700 also includes a higher order distortion section 712. In the present example, the higher order distortion section 712 particularly includes a second order (or squared) distortion section 714 and a third order (or cubic) distortion section 716. Similar to the first order distortion section 702, each of the second order distortion section 714 and the third order distortion section 716 includes the nonlinear memory section 654, which is the same block as is included in the first order distortion section 702 (and again is directed to MP and CT-B and CT-C of order 1). Also, in each of the second order distortion section 714 and the third order distortion section 716, the respective nonlinear memory section 654 again is coupled to the input terminal 602 to receive the baseband signal input $S_{in}$, and additionally includes the nonlinear memory section output port 658 by which the nonlinear memory section provides an output signal for receipt by a summation block, which in this embodiment is the summation block 704. As shown, the summation block 704 in this embodiment generates an output signal at the intermediate output terminal 706 that is based upon not only the output signals provided from the first order distortion section 702 but also from the nonlinear memory section output ports 658 of each of the second order and third order distortion sections 714 and 716.

However, each of the second order distortion section 714 and third order distortion section 716 differs from the first order distortion section 702 in that the respective nonlinear memory sections 654 of the second and third order distortion sections are not directly coupled to the intermediate input terminal 604 for receiving the envelope signal input abs(s). Rather, the second order distortion section 714 is coupled only indirectly to the intermediate input terminal 604 by way of a second order (square function) distortion block 718, and the third order distortion section 716 is coupled only indirectly to the intermediate input terminal 604 by way of a third order (cubic function) distortion block 720. Rather than the nonlinear memory sections 654 of the second and third order distortion sections 714 and 716 operating directly in response to the envelope signal input abs(s) as in the case of the nonlinear memory section 654 of the first order distortion section 712, the nonlinear memory sections 654 of the second and third order distortion sections 714 and 716 instead operate based upon modified envelope input signals. In the present embodiment, the modified envelope input signal (or function) env(s) is determined in accordance with Equation (13):

$$env(s) = (abs(s))^k, k >= 2 \qquad (13)$$

The envelope function env(s) transforms the real-valued envelope abs(s) by raising it to an arbitrary power not smaller than 1 (and is easy to implement because it involves real-valued operands).

Notwithstanding the above description in which the model architecture 700 is described as having the first order distortion section 702 that includes each of the main distortion section 652 and the nonlinear memory section 654 and also having the higher order distortion section 712 that includes each of the second order distortion section 714 and the third order distortion section 716, the model architecture 700 may also be described in a different manner. Namely, the model architecture 700 may also be described as having the main distortion section (e.g. SP kernel and MP kernel terms of zero or low order) 652 and also having a multi-order nonlinear memory section (or kernel) 717 that includes each of the nonlinear memory section 654 of the first order distortion section 702 as well as each of the second order distortion section 714 and third order distortion section 716 (as well as any further-order distortion section(s) that may be present depending upon the embodiment), which also include the respective nonlinear memory sections 654.

The present disclosure additionally is intended to encompass numerous embodiments including those disclosed herein as well as a variety of alternate embodiments. In at least some example embodiments encompassed herein, the present disclosure relates to a digital front-end circuit for use in performing radio frequency (RF) transmission. The digital front-end circuit includes a digital predistortion (DPD) block having a first input terminal and a first output terminal, a power amplifier (PA) having a second input terminal and a second output terminal, and a transmitter coupling the first output terminal of the DPD block at least indirectly with the second input terminal of the PA. The DPD block is configured to receive a first input signal and to provide a first output signal having first and second components at the first output terminal. Further, the DPD block includes a main distortion kernel that is configured to generate the first component of the first output signal based at least indirectly upon the first input signal by performing first processing equaling or substantially corresponding to each of at least one static polynomial (SP) calculation, and at least one first memory polynomial (MP) calculation. Also, the DPD block additionally includes a nonlinear memory kernel that is configured to generate the second component of the first output signal based at least indirectly upon the first input signal by performing second processing at least partly corresponding to each of at least one second MP calculation of a first order, and at least one cross-term memory polynomial (CP) calculation of a first order. Further, the nonlinear memory kernel is configured to perform the second processing at least in part by a first nonlinear envelope modulator including a first linear finite impulse response (FIR) filter.

Additionally, in at least some example embodiments encompassed herein, the present disclosure relates to a system for digital predistortion (DPD). The system includes a DPD block having a first input terminal and a first output terminal, a power amplifier (PA) having a second input terminal and a second output terminal, and a transmitter coupling the first output terminal of the DPD block at least indirectly with the second input terminal of the PA. The DPD block is configured to receive a first input signal and to provide a first output signal having first and second components at the first output terminal. Further, the DPD block includes an envelope signal generation block that is configured to generate an envelope input signal based upon the first input signal. Additionally, the DPD block includes a main distortion kernel that is configured to generate the first component of the first output signal based at least indirectly upon each of the first input signal and the envelope input signal by performing first processing equaling or substantially corresponding to each of at least one static polynomial (SP) calculation, and at least one first memory polynomial (MP) calculation. Also, the DPD block additionally includes a nonlinear memory kernel that is configured to generate the second component of the first output signal based at least indirectly upon each of the first input signal and the envelope input signal by performing second processing at least partly corresponding to each of at least one second MP calculation of a first order, and at least one cross-term memory polynomial (CP) calculation of a first order. Further, the nonlinear memory kernel includes each of a first nonlinear envelope modulator and a second nonlinear envelope modulator, and each of the first and second nonlinear envelope modulators includes a respective linear finite impulse response (FIR) filter. Additionally, the nonlinear memory kernel additionally includes at least one time delay so that one or both of the first input signal and the envelope input signal are received by the second nonlinear envelope modulator in a delayed manner by comparison with when the first nonlinear envelope modulator receives one or both of the first input signal and the envelope input signal.

Further, in at least some example embodiments encompassed herein, the present disclosure relates to a method of digital predistortion (DPD) for a power amplifier (PA). The method includes receiving a first input signal at a first input terminal of a digital predistortion (DPD) block that additionally includes a first output terminal. Also, the method includes performing first processing, at a main distortion kernel of the DPD block, so as to generate a first component of a first output signal based at least indirectly upon the first input signal, where the first processing equals or substantially corresponds to each of at least one static polynomial (SP) calculation, and at least one first memory polynomial (MP) calculation. Additionally, the method includes performing second processing at a nonlinear memory kernel of the DPD block so as to generate a second component of the first output signal based at least indirectly upon the first input signal, where the second processing at least partly corresponds to each of at least one second MP calculation of a first order, and at least one cross-term memory polynomial (CP) calculation of a first order. The nonlinear memory kernel is configured to perform the second processing at least in part by a first nonlinear envelope modulator including a first linear finite impulse response (FIR) filter. Further, the method includes providing the first output signal having the first and second components from the first output terminal of the DPD block for receipt by a transmitter coupling the first output terminal of the DPD block at least indirectly with a second input terminal of a power amplifier (PA) having a second output terminal.

It should be appreciated that embodiments encompassed herein may be applied as a real-time actuator of a DPD system in a VLSI such as application specific integrated circuit/field programmable gate array (ASIC/FPGA) HW as hardware description language (HDL) code, or in a vector processor (or a VLSI employing vector processing) as embedded SW (or embedded code). In at least some embodiments, any one or more, or all, of the blocks shown in the block diagrams of FIGS. 2, 3, 4, 5, 6, and 7 are physical units in a digital very large scale integration (VLSI) integrated circuit or device such as an ASIC or FPGA, e.g., are provided by dedicated areas in silicon. In addition, or alternatively, any one or more, or all, of the blocks shown in the block diagrams of FIGS. 2, 3, 4, 5, 6, and 7 may be functionally provided in a vector processor (e.g., as a second or alternative option). Also, or alternatively, any one or more, or all, of the blocks shown in the block diagrams of FIGS. 2, 3, 4, 5, 6, and 7 (e.g., various polynomial functions) may be implemented by LUTs, delay lines, FIREs. (e.g., FIRE filters), and/or FIRs (e.g., FIR filters).

At least some of the methods, techniques, options, models, architectures, and systems encompassed herein for performing DPD in relation to PAs are directly applicable to broadband PAs in which memory effects and bandwidth ripple dominate over raw nonlinearity and levels of second harmonics and IMDs. Further, at least some of the methods, techniques, options, models, architectures, and systems encompassed herein may be employed in any of a variety of products including, for example, mmWave antenna array beamformer ICs, WLAN WiFi PAs, MMIMO 5G PAMs, and open radio access network (RAN) PA or open RAN applications (e.g., involving edge processing). The present disclosure additionally encompasses numerous systems that employ embodiments of the models and architectures described herein. Such systems may include base stations and/or any of a variety of types of transmitters, receivers, transceivers, and other devices.

Additionally, it should be recognized that one or more of the embodiments encompassed herein may be advantageous in any of a variety of respects. At least some embodiments encompassed herein achieve or realize one or more advantages because those embodiments employ or utilize nonlinear modulators (rather than GMPs). Further, at least some embodiments encompassed herein are advantageous in that the embodiments achieve or realize one or more of:
1) better approximation of complex memory dynamics, including for example (a) approximation of long-term memory effects, and/or (b) equalization and modeling wide BW linear and non-linear ripple;
2) lower complexity of computation, such as for example (a) two times (2×) simpler multiply operations (real-complex vs complex-complex), (b) minimal dependency on nonlinear functions (e.g., limited to one instance), and/or (c) exclusive use of FIR filters rather than nonlinear filters;
3) easy scalability to higher order nonlinearity, including for example (a) re-instantiation of the same functional blocks, and/or (b) minimal preconditioning of the real envelope input by exponent function;
4) superior behavioral (behavior) in PA device and circuit modeling, including for example (a) accurate approximation of resonances, and/or (b) natural mapping and visualization of the derived coefficients in frequency domain; and
5) very efficient DPD, including for example (a) in terms of having the same powerful tunability and configurability that is typical for GMP, (b) in terms of providing coverage of more memory effects for the same use of resources, and/or (c) in terms of being more efficient than NL function or NL filter approaches for weakly nonlinear linear but broadband PAs.

Further, one or more of the embodiments encompassed herein may be advantageous in one or more additional respects. For example, in at least some embodiments encompassed herein, the approximation of the PA nonlinearity is done using a format of the Volterra kernels that is different from the canonical form of GMP. This allows the application of efficient FIR filter structures instead of polynomials, which is advantageous insofar as polynomials are in essence arbitrary nonlinear functions that may require additional complexity to implement and manage in a solution. Also for example, in at least some embodiments encompassed herein, the memory effects are represented by low order Volterra kernels, which may be defined as nonlinear envelope modulators with FIR filter memory. The identification process has 2 dimensions—memory depth of the FIR filters and memory depth of the baseband samples. Adding higher order terms may be easily achieved by feeding the modulator array with higher power envelope signals (>=2). The baseband signal samples and their conjugates do not participate in multi-operand (with more than 2 operands) complex-valued multiplications.

Additionally for example, in at least some embodiments encompassed herein, NL modulators of the signal envelope (rather than its square) are the main functional blocks, and also higher envelope powers not limited to two may be used seamlessly (this includes even and odd ones). The operations are entirely in time domain, the operations use wide-bandwidth modulated signals, and the relationship to the Volterra kernels is straightforward. Further, extensive usage of delay elements efficiently implements arbitrary main-memory and cross-term offsets. Additionally, the application domains include PA modelling as well as DPD, and the model parameters may be derived iteratively during PA operation.

Further for example, in at least some embodiments encompassed herein, the use of NL functions is limited to the main AM-xM instantaneous memoryless nonlinearity, which is common and necessary for any behavioral PA model, and the memory effects are approximated without the involvement of arbitrary NL functions and specifically without Volterra terms constructed by addressing LUTs (only the baseband signal samples are used as basis for the Volterra terms). Also for example, at least some embodiments encompassed herein employ FIR filters that are more efficient than conventional systems, because the FIR filters apply the model coefficients in half complex-valued multipliers: real-valued signal (envelope) times complex-value coefficient. This is significant because it drives down the power consumption and area/time resources in the real-time applications. The implementation of main-memory and cross-terms is happening in the same FIR filter and the routing or the co-dependency on different inputs and outputs among the functional blocks is much simpler.

Additionally for example, at least some embodiments encompassed herein are advantageous because the embodiments employ an array of combined NL modulators made with linear filters with fixed coefficients. Embodiments employing an array of combined NL modulators having linear filters with fixed coefficients is more efficient and may be more simply implemented than at least some other embodiments, such as embodiments employing a linear filter with coefficients calculated dynamically for each sample by aggregating appropriately delayed NL function outputs because, for example, the utilization of NL function blocks (polynomial, spline, LUT, etc.) in which the number is proportional to the NL memory depth. Also, at least some embodiments encompassed herein are advantageous in that those embodiments utilize envelope signals and squared envelopes (rather than arbitrary NL functions), which may be important especially for mid-low power PAs, where the nonlinear order is lower. The flexibility to tune different envelope filter lengths per envelope order allows for simplification of the adaptation process, avoiding of overmodeling, and improvements to the numerical stability for weakly nonlinear PAs. For example, the filter in the modulator of the squared and cubed envelope may be respectively 2 and 3 times shorter than the envelope one.

While the principles of the invention have been described above in connection with specific apparatus, it is to be clearly understood that this description is made only by way of example and not as a limitation on the scope of the invention. It is specifically intended that the present invention not be limited to the embodiments and illustrations contained herein, but include modified forms of those embodiments including portions of the embodiments and combinations of elements of different embodiments as come within the scope of the following claims.

The invention claimed is:

1. A digital front-end circuit for use in performing radio frequency (RF) transmission, the digital front-end circuit comprising:
   a digital predistortion (DPD) block having a first input terminal and a first output terminal;
   a power amplifier (PA) having a second input terminal and a second output terminal; and
   a transmitter coupling the first output terminal of the DPD block at least indirectly with the second input terminal of the PA,
   wherein the DPD block is configured to receive a first input signal and to provide a first output signal having first and second components at the first output terminal,
   wherein the DPD block includes a main distortion kernel that is configured to generate the first component of the first output signal based at least indirectly upon the first input signal by performing first processing equaling or substantially corresponding to each of at least one static polynomial (SP) calculation, and at least one first memory polynomial (MP) calculation, and
   wherein the DPD block additionally includes a nonlinear memory kernel that is configured to generate the second component of the first output signal based at least indirectly upon the first input signal by performing second processing at least partly corresponding to each of at least one second MP calculation of a first order, and at least one cross-term memory polynomial (CP) calculation of a first order, and
   wherein the nonlinear memory kernel is configured to perform the second processing at least in part by a first nonlinear envelope modulator including a first linear finite impulse response (FIR) filter.

2. The digital front-end circuit of claim 1, wherein the first linear FIR filter is configured to have a first FIR input port, a first FIR output port, a plurality of multiplication blocks each having a respective first multiplication block input port, a respective second multiplication block input port, and a respective multiplication block output port, a first summation block, and a plurality of unit tap-delays coupled at least indirectly to the first FIR input port, wherein the unit tap-delays respectively include respective output nodes that are respectively coupled to the respective first multiplication block input ports of the respective multiplication blocks.

3. The digital front-end circuit of claim 2, wherein the first linear FIR filter additionally is configured to have a plurality of coefficients and to provide the respective coefficients to the respective second multiplication block input ports of the respective multiplication blocks.

4. The digital front-end circuit of claim 3, wherein the first linear FIR filter further is configured so that the first summation block is coupled to each of the multiplication block output ports of the multiplication blocks so as to receive a plurality of respective multiplication block output signals respectively output at the respective multiplication block output ports, and to output a first linear FIR filter output signal based at least indirectly upon a sum of the received multiplication block output signals.

5. The digital front-end circuit of claim 4, wherein the respective multiplication block output signals are respectively generated by the respective multiplication blocks by multiplying, at the respective multiplication blocks, the respective coefficients provided to the respective second multiplication block input ports and respective output node signals received at the respective first multiplication block input ports from the respective output nodes.

6. The digital front-end circuit of claim 5,
   wherein the first linear FIR filter is configured to receive, at a first input port, an envelope input signal that is based upon the first input signal, and
   wherein the first nonlinear envelope modulator further includes, in addition to the first linear FIR filter, a first additional multiplication block that outputs a first nonlinear envelope modulator output signal that is generated by multiplying the first linear FIR output signal and the first input signal.

7. The digital front-end circuit of claim 6, wherein the second component of the first output signal is based at least indirectly, at least in part, upon the first nonlinear envelope modulator output signal.

8. The digital front-end circuit of claim 7, wherein the DPD block includes a second summation block at which the first component and second components are received, wherein the second summation block is configured to sum the first and second components and to output a second summation block output signal, wherein either the first output signal is the second summation block output signal or the first output signal is additionally output by a bandwidth limiting FIR filter based upon the second summation block output signal.

9. The digital front-end circuit of claim 2, wherein the nonlinear memory kernel is configured to perform the second processing additionally at least in part by a second nonlinear envelope modulator including a second linear FIR filter.

10. The digital front-end circuit of claim 9, wherein each of the first nonlinear envelope modulator and the second nonlinear envelope modulator has a respective first input port that is configured to receive a respective first additional input signal based at least indirectly upon the first input signal and a respective second input port that is configured to receive a respective second additional input signal that is based at least indirectly upon the first input signal.

11. The digital front-end circuit of claim 10,
wherein the respective first additional input signal received at the respective first input port of the first nonlinear envelope modulator is a first modified version of the first input signal generated by a first non-causal memory depth block based upon the first input signal,
wherein the respective first additional input signal received at the respective first input port of the second nonlinear envelope modulator is a second modified version of the first input signal generated by a second non-causal memory depth block based upon a first time-delayed version of the first input signal,
wherein the respective second additional input signal received at the respective second input port of the first nonlinear envelope modulator is an envelope input signal generated by an envelope signal generation block based upon the first input signal, and
wherein the respective second additional input signal received at the respective second input port of the second nonlinear envelope modulator is a second time-delayed version of the envelope input signal.

12. The digital front-end circuit of claim 11,
wherein the nonlinear memory kernel includes a further summation block and a sample alignment section including first and second additional delay blocks,
wherein each of the first nonlinear envelope modulator and the second nonlinear envelope modulator has a respective first output port,
wherein the first and second additional delay blocks are configured respectively to couple the respective first output ports of the first and second nonlinear envelope modulators, respectively, to the further summation block.

13. The digital front-end circuit of claim 12, wherein the DPD block includes a second summation block at which the first component and second components are received, wherein the second summation block is configured to sum the first and second components and to output a second summation block output signal, wherein either the first output signal is the second summation block output signal or the first output signal is additionally output by a bandwidth limiting FIR filter based upon the second summation block output signal.

14. The digital front-end circuit of claim 13, wherein the second component received by the second summation block is provided as a further output signal from the further summation block.

15. The digital front-end circuit of claim 2, wherein the nonlinear memory kernel also includes, in addition to the first nonlinear envelope modulator, a higher order distortion section including at least one additional nonlinear envelope modulator in combination with a higher order function block including either a square function block or a cubic function block, and wherein the second component includes signal portions provided by each of the first nonlinear envelope modulator and the at least one additional nonlinear envelope modulator.

16. The digital front-end circuit of claim 1, wherein the digital front-end circuit is implemented on a single integrated circuit, and wherein the at least one first MP calculation includes a low order MP calculation including at least zero order kernels.

17. The digital front-end circuit of claim 1, wherein the DPD block is implemented using a vector processor.

18. A system for digital predistortion (DPD), the system comprising:
a DPD block having a first input terminal and a first output terminal;
a power amplifier (PA) having a second input terminal and a second output terminal; and
a transmitter coupling the first output terminal of the DPD block at least indirectly with the second input terminal of the PA,
wherein the DPD block is configured to receive a first input signal and to provide a first output signal having first and second components at the first output terminal,
wherein the DPD block includes an envelope signal generation block that is configured to generate an envelope input signal based upon the first input signal,
wherein the DPD block includes a main distortion kernel that is configured to generate the first component of the first output signal based at least indirectly upon each of the first input signal and the envelope input signal by performing first processing equaling or substantially corresponding to each of at least one static polynomial (SP) calculation, and at least one first memory polynomial (MP) calculation, and
wherein the DPD block additionally includes a nonlinear memory kernel that is configured to generate the second component of the first output signal based at least indirectly upon each of the first input signal and the envelope input signal by performing second processing at least partly corresponding to each of at least one second MP calculation of a first order, and at least one cross-term memory polynomial (CP) calculation of a first order,
wherein the nonlinear memory kernel includes each of a first nonlinear envelope modulator and a second nonlinear envelope modulator,
wherein each of the first and second nonlinear envelope modulators includes a respective linear finite impulse response (FIR) filter, and
wherein the nonlinear memory kernel additionally includes at least one time delay so that one or both of the first input signal and the envelope input signal are received by the second nonlinear envelope modulator in a delayed manner by comparison with when the first nonlinear envelope modulator receives one or both of the first input signal and the envelope input signal.

19. A wireless transmission device including the system of claim 18, wherein the DPD block, the PA, and the transmitter are implemented on a single integrated circuit, and wherein the nonlinear memory kernel further includes a higher order distortion section including at least one additional nonlinear envelope modulator in combination with a higher order function block including either a square function block or a cubic function block.

20. A method of digital predistortion (DPD) for a power amplifier (PA), the method comprising:
receiving a first input signal at a first input terminal of a digital predistortion (DPD) block that additionally includes a first output terminal;
performing first processing, at a main distortion kernel of the DPD block, so as to generate a first component of a first output signal based at least indirectly upon the first input signal, wherein the first processing equals or substantially corresponds to each of at least one static polynomial (SP) calculation, and at least one first memory polynomial (MP) calculation,
performing second processing at a nonlinear memory kernel of the DPD block so as to generate a second component of the first output signal based at least indirectly upon the first input signal, wherein the second processing at least partly corresponds to each of at least one second MP calculation of a first order, and at least one cross-term memory polynomial (CP) calculation of a first order, wherein the nonlinear memory kernel is configured to perform the second processing at least in part by a first nonlinear envelope modulator including a first linear finite impulse response (FIR) filter; and providing the first output signal having the first and second components from the first output terminal of the DPD block for receipt by a transmitter coupling the first output terminal of the DPD block at least indirectly with a second input terminal of a power amplifier (PA) having a second output terminal.

* * * * *